(12) United States Patent
Kajigai et al.

(10) Patent No.: US 8,298,105 B2
(45) Date of Patent: Oct. 30, 2012

(54) HYBRID DRIVE DEVICE

(75) Inventors: Naoki Kajigai, Anjo (JP); Yasuo Shirai, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 386 days.

(21) Appl. No.: 12/568,292

(22) Filed: Sep. 28, 2009

(65) Prior Publication Data

US 2010/0078281 A1   Apr. 1, 2010

(30) Foreign Application Priority Data

Sep. 30, 2008 (JP) ................................. 2008-252276
Sep. 30, 2008 (JP) ................................. 2008-252277

(51) Int. Cl.
*F16H 47/08* (2006.01)
(52) U.S. Cl. ................................. 475/35; 475/43; 475/45
(58) Field of Classification Search ................. 475/5, 35, 475/42–46
See application file for complete search history.

(56) References Cited

U.S. PATENT DOCUMENTS

| | | | | |
|---|---|---|---|---|
| 4,410,071 A | * | 10/1983 | Osterman | ........................... 477/4 |
| 4,743,776 A | * | 5/1988 | Baehler et al. | .................. 290/31 |
| 5,789,823 A | | 8/1998 | Sherman | |
| 5,801,499 A | * | 9/1998 | Tsuzuki et al. | ............... 318/141 |
| 6,217,476 B1 | | 4/2001 | Müller et al. | |
| 6,258,001 B1 | * | 7/2001 | Wakuta et al. | ..................... 475/5 |
| 6,599,214 B2 | * | 7/2003 | Swales | ........................... 475/35 |
| 6,616,569 B2 | * | 9/2003 | Hoang et al. | ...................... 477/3 |
| 7,341,534 B2 | * | 3/2008 | Schmidt | ............................. 475/5 |
| 2006/0289209 A1 | | 12/2006 | Grosspietsch et al. | |
| 2008/0011529 A1 | | 1/2008 | Hoher et al. | |

FOREIGN PATENT DOCUMENTS

JP   2000-110916 A   4/2000
JP   2008-24298 A   2/2008

* cited by examiner

*Primary Examiner* — Ha D. Ho
(74) *Attorney, Agent, or Firm* — Buchanan Ingersoll & Rooney PC

(57) ABSTRACT

A hybrid drive device, which has a motor generator on a power transmission path between an engine and an automatic transmission apparatus, includes a fluid clutch having a pump impeller, to which a rotational force generated by the engine is inputted, and a turbine impeller being rotated when receiving a fluid from the pump impeller and outputting a rotational force to the automatic transmission apparatus, a clutch mechanism connecting the pump impeller and the turbine impeller to establish a power transmission therebetween and disconnecting the pump impeller and the turbine impeller to interrupt the power transmission therebetween, and an oil pump arranged on a power transmission path between the turbine impeller and the automatic transmission apparatus, integrally rotating with the turbine impeller and generating a hydraulic pressure for actuating the automatic transmission apparatus and the clutch mechanism, wherein the motor generator is integrally rotated with the turbine impeller.

8 Claims, 17 Drawing Sheets

EV start/ EV drive mode

Engine start/ drive mode

Regeneration mode

Re-acceleration mode

Engine start mode

EV start incapable mode

F I G. 5
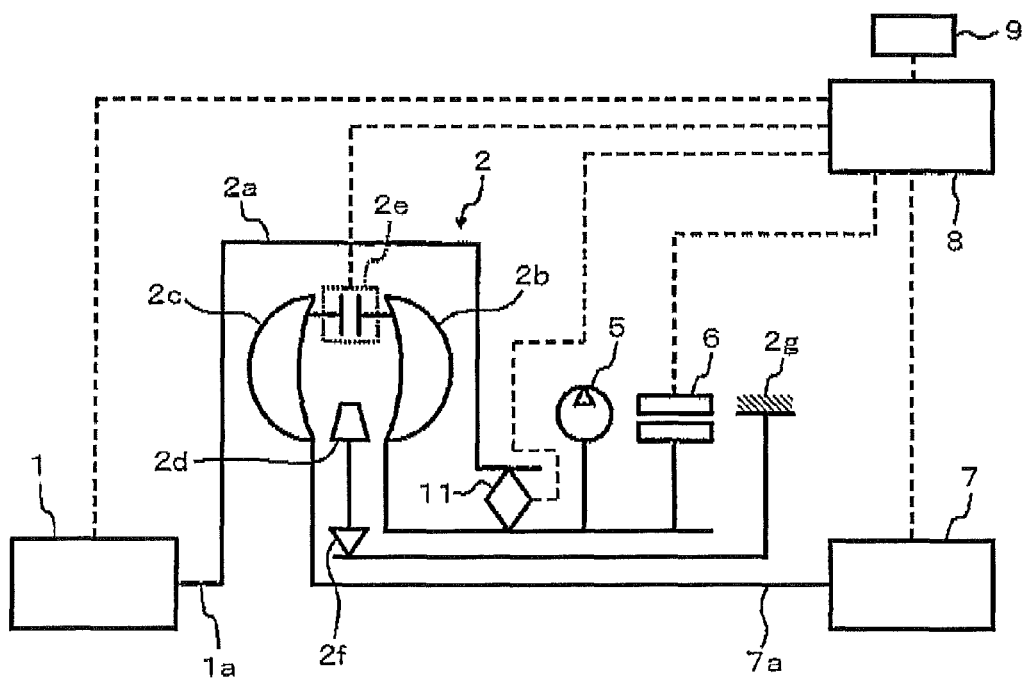

EV start/ EV drive mode

Engine start/ drive mode

Regeneration mode

Re-acceleration mode

Engine start mode

EV start incapable mode

F I G. 10
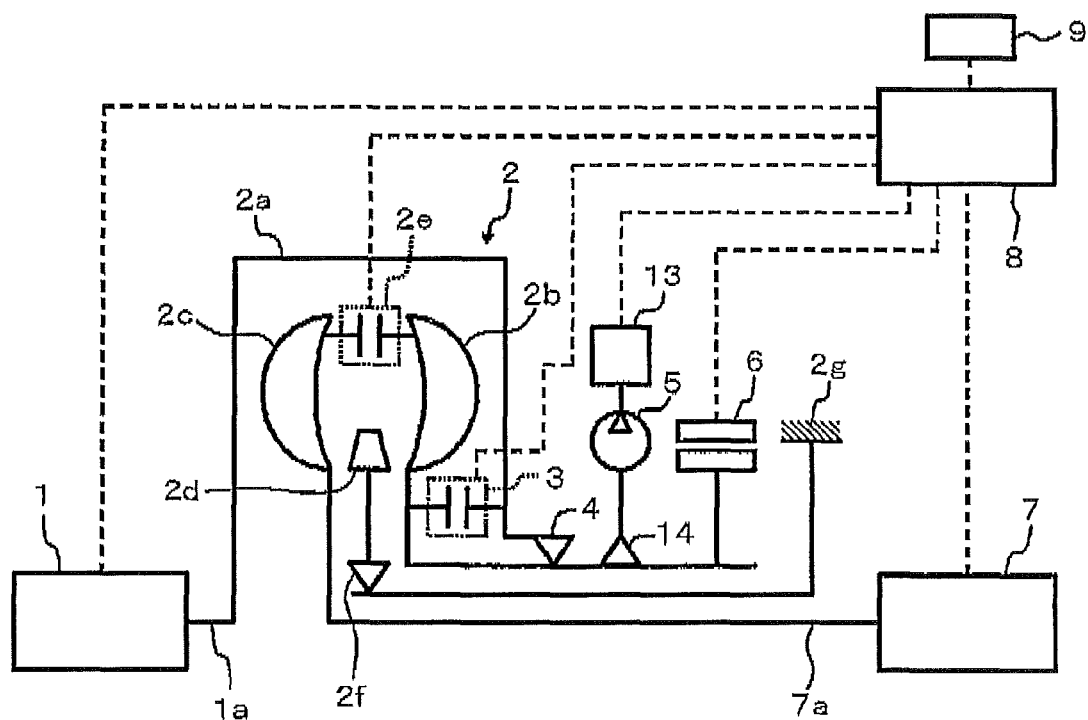

EV start/ EV drive mode

Engine start/ drive mode

Regeneration mode

Re-acceleration mode

Engine start mode

F I G. 15
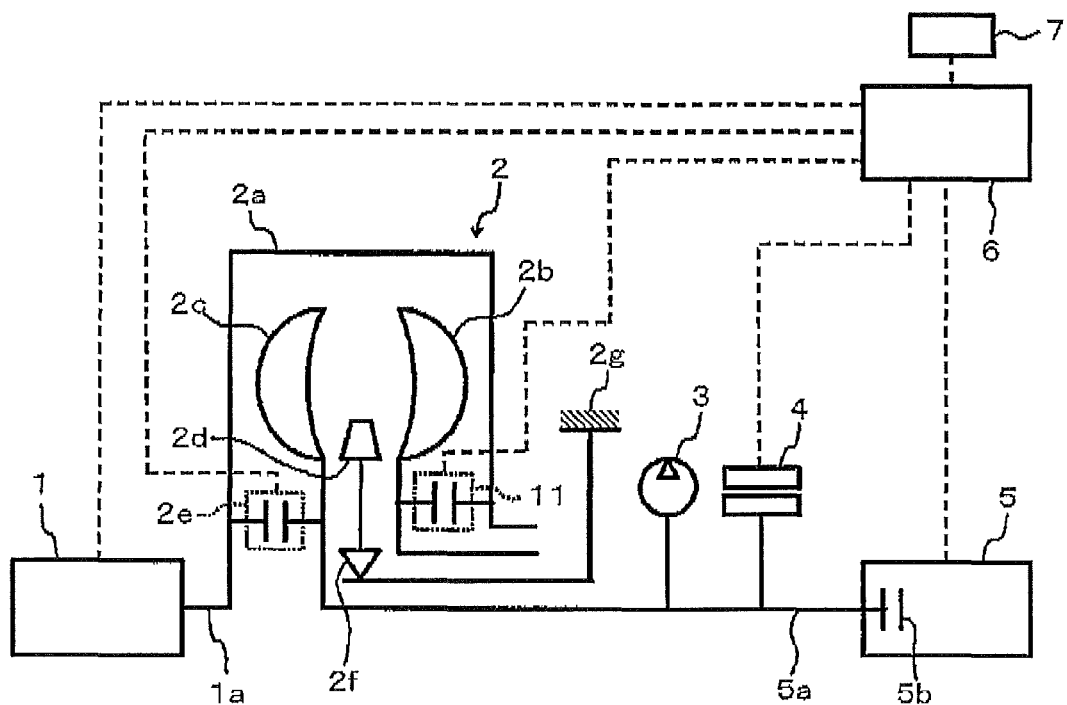

HYBRID DRIVE DEVICE

CROSS REFERENCE TO RELATED APPLICATIONS

This application is based on and claims priority under 35 U.S.C. §119 to Japanese Patent Application 2008-252276, filed on Sep. 30, 2008, and Japanese Patent Application 2008-252277, filed on Sep. 30, 2008, the entire contents of which are incorporated herein by reference.

TECHNICAL FIELD

This disclosure generally relates to a hybrid drive device having an engine, a fluid clutch, a motor generator and an automatic transmission apparatus. More specifically, this disclosure pertains to a hybrid drive device having an oil pump on a power transmission path between an engine and an automatic transmission apparatus.

BACKGROUND

There exits a known hybrid drive device having an engine, a fluid clutch, a motor generator and a transmission apparatus. Furthermore, the hybrid drive device includes an oil pump for the transmission apparatus on a power transmission path between the engine and the transmission. For example, disclosed in JP2008-24298A is a hybrid drive device having a power train that includes an electric machine and a hydraulic pressure pump for the transmission apparatus (which will be hereinafter referred to as a transmission hydraulic pressure pump) between an engine and a transmission apparatus, which establishes variable gear ratio. The electric machine, which serves as a motor and a generator, is normally connected to a driving shaft of the transmission apparatus. Furthermore, the hybrid drive device disclosed in JP2008-24298A includes a torque converter and at least one switchable first clutch device, which are disposed between the engine and the transmission apparatus. The hydraulic pressure pump is connected to the torque converter.

According to the hybrid drive device disclosed in JP2008-24298A, in a case where a general torque converter having a lock-up mechanism (i.e. a lock-up torque converter) is adapted as the torque converter, an engine torque vibration inputted into the first clutch device and a torque resonance, which is generated in response to the engine torque vibration, are hard to be restricted. In order to restrict the occurrence of the vibration and the resonance, an additional damper may need to be provided between the engine and the first clutch device, in addition to a lock-up damper. In this case, a relatively large space for providing the additional damper needs to be ensured, which may further result in increasing manufacturing costs.

In a case where a normally open-type clutch (i.e. a clutch which turns to be in an engaged state when an electrification to the clutch is turned off) is adapted as the first clutch device, even if the engine is started by some other method while the electric machine (a motor generator) is not allowed to be driven, the transmission hydraulic pressure pump is not likely to be driven because the first clutch device is in an open state (i.e. a disengaged state). Accordingly, the vehicle may not start moving.

On the other hand, in a case where a normally closed-type clutch (i.e. a clutch which turns to be in a disengaged state when the electrification to the clutch is turned off) is adapted as the first clutch device, in a process of staring and moving the vehicle, it may be conceivable to start the vehicle in the manner where: firstly, the transmission hydraulic pressure pump is driven in response to a rotation of the electric machine (the motor generator); secondly, a gear ratio is established at the transmission apparatus in response to a generated hydraulic pressure; and then starts the vehicle by means of the torque converter. However, in this case, because the electric machine (the motor generator) is rotated while the first clutch device is in the engaged state, the engine is also rotated, which may result in generating a large pumping loss. Furthermore, even if the first clutch device is turned to be in the disengaged state after a sufficient hydraulic pressure is ensured and the vehicle starts moving, it may take a relatively long time in the process of staring and moving the vehicle, in other words, a responsiveness of the hybrid drive device may be deteriorated.

Furthermore, according to the hybrid drive device, which is disclosed in JP2008-24298A and which includes the torque converter, the electric machine (the motor generator) is arranged on the power train between the first clutch device and the torque converter. Therefore, in a case where regeneration is executed by the electric machine (the motor generator), a power transmitted from the transmission apparatus is reduced by the torque converter, so that the reduced power is transmitted to the electric machine (the motor generator). As a result, regeneration efficiency at the electric machine (the motor generator) is deteriorated.

A need thus exists to provide a hybrid drive device which is not susceptible to the drawback mentioned above.

SUMMARY

According to an aspect of this disclosure, a hybrid drive device having a motor generator on a power transmission path between an engine and an automatic transmission apparatus, the hybrid drive device includes a fluid clutch having a pump impeller, to which a rotational force generated by the engine is inputted, and a turbine impeller being rotated when receiving a fluid from the pump impeller and outputting a rotational force to the automatic transmission apparatus, a clutch mechanism connecting the pump impeller and the turbine impeller to establish a power transmission therebetween and disconnecting the pump impeller and the turbine impeller to interrupt the power transmission therebetween, and an oil pump arranged on a power transmission path between the turbine impeller and the automatic transmission apparatus, integrally rotating with the turbine impeller and generating a hydraulic pressure for actuating the automatic transmission apparatus and the clutch mechanism, wherein the motor generator is integrally rotated with the turbine impeller.

According to another aspect of this disclosure, a hybrid drive device including a motor generator on a power transmission path between an engine and an automatic transmission apparatus, the hybrid drive device includes a fluid clutch having a pump impeller, to which a rotational force generated by the engine is inputted, and a turbine impeller being rotated when receiving a fluid from the pump impeller and outputting a rotational force to the automatic transmission apparatus, a first clutch mechanism provided on a power transmission path between the engine and the pump impeller and selectively executing a torque transmission from the engine to the pump impeller and a torque transmission from the pump impeller to the engine, a second clutch mechanism for connecting the pump impeller and the turbine impeller to establish a power transmission therebetween and disconnecting the pump impeller and the turbine impeller to interrupt the power transmission therebetween, and an oil pump integrally rotating with the pump impeller and generating a hydraulic pressure for actuating the automatic transmission apparatus, the first clutch mechanism and the second clutch mechanism, wherein the motor generator integrally rotates with the pump impeller.

BRIEF DESCRIPTION OF THE DRAWINGS

The foregoing and additional features and characteristics of this disclosure will become more apparent from the following detailed description considered with the reference to the accompanying drawings, wherein;

FIG. 5 is a diagram illustrating a configuration of a hybrid drive device according to a second embodiment;

FIG. 10 is a diagram schematically illustrating a configuration of a hybrid drive device according to a fourth embodiment;

FIG. 15 is a diagram illustrating a configuration of a hybrid drive device according to a sixth embodiment;

DETAILED DESCRIPTION

First Embodiment

A first embodiment of a hybrid drive device will be described below with reference to the attached drawings. Illustrated in FIG. 1 is a diagram schematically illustrating a configuration example of the hybrid drive device according to the first embodiment.

Figure 1:
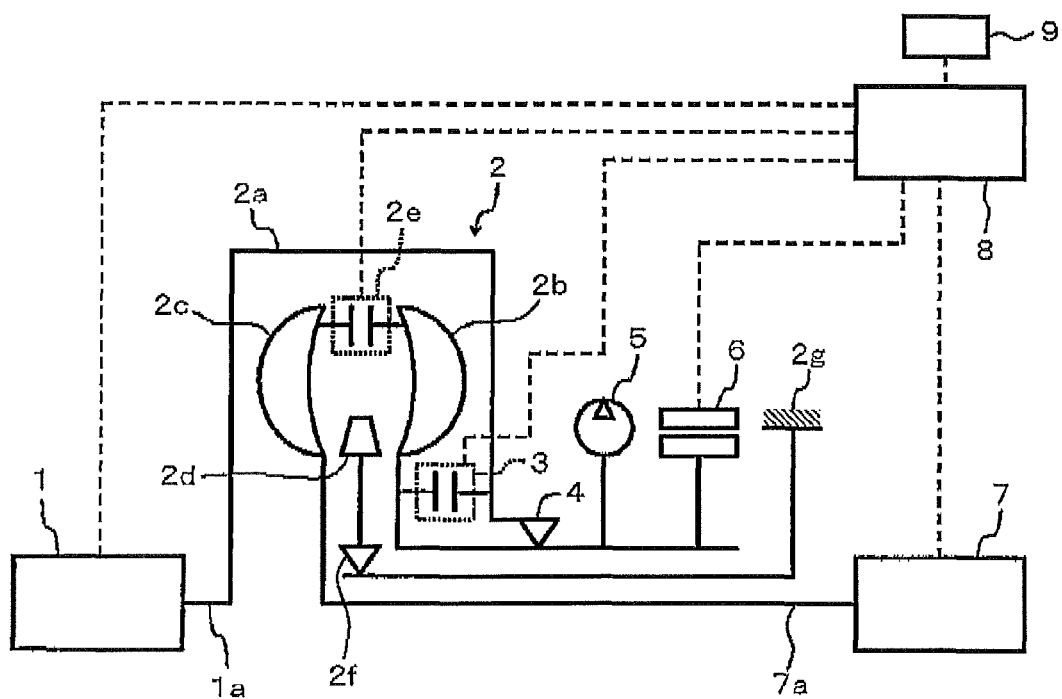
FIG. 1 is a diagram schematically illustrating a configuration of hybrid drive device according to a first embodiment.

As illustrated in FIG. 1, the hybrid drive device according to the first embodiment is a device for transmitting a rotational force, which is generated by one of or both of an engine 1 and a motor generator 8 each of which serves as a driving source, to an automatic transmission apparatus 7. Furthermore, the hybrid drive device includes a torque converter 2 (a fluid clutch), a clutch 3, a one-way clutch 4 (a first one-way clutch), an oil pump 5 for the transmission apparatus (which will be hereinafter referred to as a transmission oil pump 5), the motor generator 6, a control unit 8, which is included in a control system, and a battery 9, which is included in a power source system, on a power transmission path between the engine 1 and the automatic transmission apparatus 7. Additionally, the clutch 3 and the one-way clutch 4 configure a first clutch mechanism.

The engine 1 is an internal combustion engine, which burns a fuel in order to output the rotational force. The engine 1 outputs the rotational force from an output shaft 1a thereof. The output shaft 1a of the engine 1 is fixed at a torque converter housing 2a. Furthermore, the engine 1 includes various actuators, which adjust an injection amount of the fuel injected by an injector (including a fuel cut) and an ignition timing, and various sensors for detecting an engine rotational number (i.e. an engine rotational speed), an engine water temperature and the like. The engine 1 is controlled by the control unit 8, more specifically, the injection amount of the fuel and the ignition timing are controlled by the control unit 8. Additionally, in a case where the vehicle is in a regeneration mode, the shaft 1a of the engine 1 serves as an input shaft.

The torque converter 2 is a fluid clutch for transmitting the rotational force to the automatic transmission apparatus 7 via a fluid accommodated within the torque converter 2. Furthermore, the torque converter 2 has a torque amplification function. The torque converter 2 includes the torque converter housing 2a, a pump impeller 2b, a turbine impeller 2c, a stator 2d and a lock-up clutch 2e (a clutch mechanism, a second clutch mechanism). Alternatively, a fluid coupling, which does not have the torque amplification function, may be used as the fluid clutch (a fluid connector), instead of the torque converter 2.

The torque converter housing 2a is connected to the output shaft 1a of the engine 1. Furthermore, the torque converter housing 2a is connected to one end portion of the clutch 3 and one end portion of the one-way clutch 4.

The pump impeller 2b is an impeller for transmitting a hydraulic pressure to the turbine impeller 2c. Furthermore, the pump impeller 2b is connected to the torque converter housing 2a, which is connected to the output shaft 1a of the engine 1, via the clutch 3 and the one-way clutch 4, which are connected in parallel. The pump impeller 2b is normally fixed at the transmission oil pump 5 and the motor generator 6 (a rotor). More specifically, the pump impeller 2b is connected to the torque converter housing 2a via the clutch 3 and the one-way clutch 4, which are provided in parallel, so that the driving force is normally transmitted from the torque converter housing 2a to the pump impeller 2b by the one-way clutch 4 without being influenced by a state of the clutch 3 (i.e. either an engaged state or an disengaged state of the clutch 3). However, the driving force is transmitted from the pump impeller 2b to the torque converter housing 2a only in the case where the clutch 3 is in the engaged state.

The turbine impeller 2c is an impeller, which rotates when receiving the hydraulic pressure transmitted from the pump impeller 2b. Furthermore, the turbine impeller 2c is connected to an input shaft 7a of the transmission apparatus 7. Additionally, in the case where the vehicle is in the regeneration mode, the shaft 7a of the transmission apparatus 7 serves as an output shaft.

The stator 2d is fixed at a case 2g of the torque converter 2 via a one-way clutch 2f.

The lock-up clutch 2e is a clutch that directly connects the pump impeller 2b, which serves as an input portion of the torque converter 2, and the turbine impeller 2c, which serves as an output portion of the torque converter 2, in order to transmit the force between the pump impeller 2b and the turbine impeller 2e in a case where a rotational difference between the pump impeller 2b and the turbine impeller 2c is small, in order to avoid a power transmission loss, which is likely to occur due to a slippage of the fluid. Additionally, in the case where the vehicle is in the regeneration mode, the pump impeller 2b serves as an output portion of the torque converter 2 and the turbine impeller 2c serves as an input portion of the torque converter 2. A wet-type clutch using a frictional material, which is actuated in response to the hydraulic pressure, may be used as the lock-up clutch 2e. The lock-up clutch 2e is connected to a fluid-type transmitting mechanism, which is configured by the pump impeller 2b and the turbine impeller 2c, in parallel. More specifically, one end portion of the lock-up clutch 2e is connected to the pump impeller 2b and the other end portion of the lock-up clutch 2e is connected to the turbine impeller 2c. The lock-up clutch 2e is controlled by the control unit 8 in order to establish a disengaged state and an engaged state. The lock-up clutch 2e allows the rotational difference between the pump impeller 2b and the turbine impeller 2c in the case where the lock-up clutch 2e is in the disengaged state. On the other hand, in the case where the lock-up clutch 2e is in the engaged sate, the lock-up clutch 2e integrally rotates the pump impeller 2b and the turbine impeller 2c. Furthermore, the lock-up clutch 2e includes a damper (a lock-up damper) for absorbing an engine torque vibration.

The clutch 3 is a device for interrupting and establishing the power transmission between the torque converter housing 2a and the pump impeller 2b and between the torque converter housing 2a and the motor generator 6 (i.e. a disengaged state and an engaged state of the clutch 3). A wet-type clutch having a frictional material, which is actuated in response to the hydraulic pressure, may be used as the clutch 3. One end portion of the clutch 3 is connected to the torque converter housing 2a and the other end portion of the clutch 3 is connected to the pump impeller 2b. The clutch 3 is arranged on the power transmission path so as to be in parallel with the one-way clutch 4. Furthermore, the clutch 3 is controlled by the control unit 8, more specifically, the interruption/establishment of the power transmission by the clutch 3 (i.e. the disengaged state/engaged state of the clutch 3) are controlled by the control unit 8.

The one-way clutch 4 transmits the rotational force from the torque converter housing 2a to the pump impeller 2b and the motor generator 6 in a case where the driving force generated by the engine 1 (the torque converter housing 2a) is greater than the driving force generated at the pump impeller 2b and the motor generator 6. Furthermore, the one-way clutch 4 also serves as a free wheel, which allows the torque converter housing 2a to idly rotate relative to the pump impeller 2b and the motor generator 6, in a case where the driving force generated by the engine 1 (the torque converter housing 2a) is smaller than the driving force generated by the pump impeller 2b and the motor generator 6. The one-way clutch 4 is arranged on the power transmission path so as to be in parallel with the clutch 2.

The transmission oil pump 5 is a pump that generates the hydraulic pressure for actuating friction elements, which are mainly used for configuring a gear stage at the automatic transmission apparatus 7. Furthermore, the transmission oil pump 5 generates the hydraulic pressure for actuating the clutch 5 and the lock-up clutch 2e. The transmission oil pump 5 is normally fixed at the pump impeller 2b and the motor generator 6, so that the transmission oil pump 5 is integrally rotated with the pump impeller 2b and the motor generator 6. More specifically, the transmission oil pump 5 is certainly rotated via the output shaft 1a, the torque converter housing 2a and the one-way clutch 4 in a case where the engine 1 is rotated (driven). Furthermore, the transmission oil pump 5 is certainly rotated in a case where the motor generator 6 is rotated (actuated).

The motor generator 6 is a synchronous generator-motor, which is driven as a generator and an electric motor. The motor generator 6 is normally fixed at the pump impeller 2b and the transmission oil pump 5, so that the motor generator 6 integrally rotates with the pump impeller 2b and the transmission oil pump 5. The motor generator 6 is connected to the torque converter housing 2a via the clutch 3 and the one-way clutch 4, which are arranged in parallel with each other. Accordingly, the driving force is normally transmitted from the torque converter housing 2a to the motor generator 6 via the one-way clutch 4 without being influenced by the state of the clutch 3 (i.e. the engaged state and the disengaged state of the clutch 3). However, the driving force is transmitted from the motor generator 6 to the torque converter housing 2a only in the case where the clutch 3 is in the engaged state. Additionally, the motor generator 6 is controlled by the control unit 6.

The automatic transmission apparatus 7 is a transmission apparatus that automatically executes a starting operation and a shifting operation. The automatic transmission apparatus 7 includes the input shaft 7a into which the rotational force generated at the turbine impeller 2c is inputted. Furthermore, the automatic transmission apparatus 7 includes plural planetary gears for configuring gear stages, the friction elements for disengaging/engaging rotational elements of respective plural planetary gears and hydraulic passages for actuating the respective friction elements. The automatic transmission apparatus 7 receives the hydraulic pressure generated by the transmission oil pump 5 in order to establish an appropriate gear stage. Furthermore, the automatic transmission apparatus 7 includes various actuators for switching oil passages and for adjusting the hydraulic pressure. The hydraulic passages of the automatic transmission apparatus 7 supply the hydraulic pressure, which is used for actuating the lock-up clutch 2e and the clutch 3, so as to be switchable and adjustable. Additionally, the automatic transmission apparatus 7 is controlled by the control unit 8.

The control unit 8 is a computing device that controls operations of the engine 1, the lock-up clutch 2e, the clutch 3, the motor generator 6 and the automatic transmission apparatus 7. The control unit 8 is electrically connected to the battery 9. Furthermore, the control unit 8 is electrically connected to various sensors, such as an acceleration opening degree sensor, a shift position sensor, a rotational sensor and the like. The control unit 8 executes a control process on the basis of a predetermined program (including a data base, a map and the like). A detailed description of the control operation executed by the control unit 8 will be described later.

The battery 9 is a secondary cell, which is chargeable and dischargeable. Furthermore, the battery 9 is electrically connected to the control unit 8.

An operation of the hydraulic drive device according to the first embodiment will be described below in accordance with the attached drawings. Illustrated in FIGS. 2 to 4 are diagrams of a torque flow established in response to an operation mode of the hydraulic drive device according to the first embodiment.

<1. EV Start/EV Drive Mode>

Figure 2A:
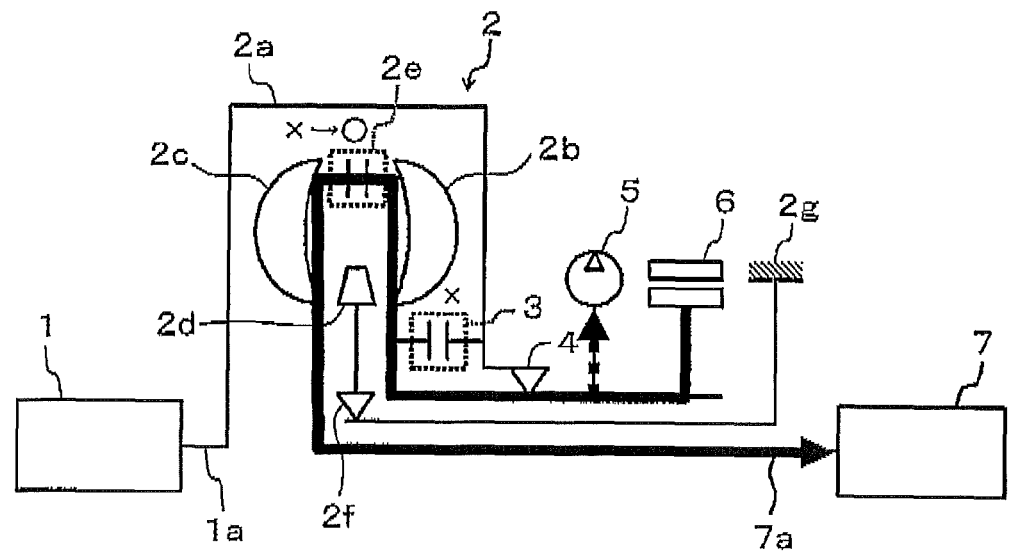
FIG. 2A is a diagram illustrating a torque flow in a case where the hybrid drive device according to the first embodiment is in an EV start/EV drive mode.
Figure 2B:
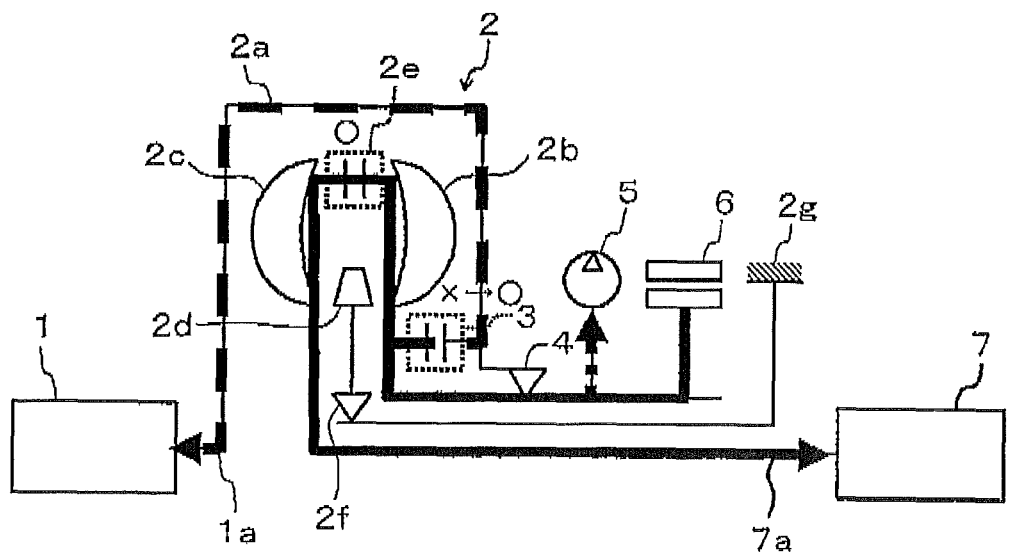
FIG. 2B is a diagram illustrating a torque flow in a case where the hybrid drive device according to the first embodiment is in an engine start/drive mode.
Figure 3A:
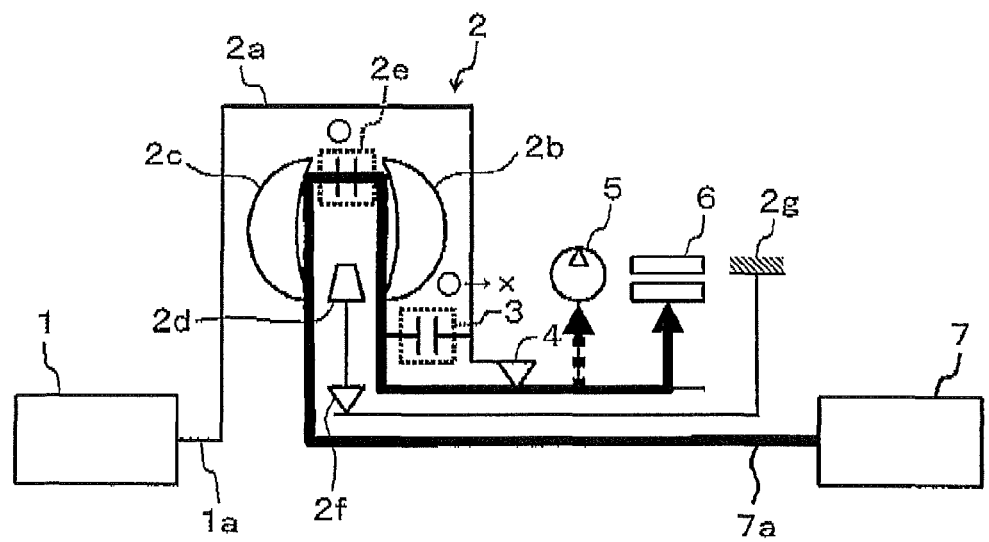
FIG. 3A is a diagram illustrating a torque flow in a case where the hybrid drive device according to the first embodiment is in a regeneration mode.

Referring to FIG. 2A, in an EV start/EV drive mode (i.e. in a starting and driving process of the hybrid drive device by electricity supplied thereto (i.e. by means of a motor) while the engine 1 is in a stopped state), the control unit 8 firstly rotates the motor generator 6 in order to actuate the transmission oil pump 5. The control unit 8 controls the automatic transmission apparatus 7 in order to establish a starting stage by means of the hydraulic pressure generated by the transmission oil pump 5. The driving force generated by the motor generator 6 is transmitted to the automatic transmission apparatus 7 via the fluid accommodated within the torque converter 2. Accordingly, the vehicle starts moving. Shortly after, the control unit 8 controls the lock-up clutch 2e so as to be in the engaged state. Accordingly, the driving output generated by the motor generator 6 is transmitted to the automatic transmission apparatus 7 without causing an energy loss, which is likely to occur due to the fluid of the torque converter 2.

<2. Engine Start/Drive Mode>

Referring to FIG. 23, in a case where the driving force by the engine 1 becomes necessary while the vehicle is in an EV drive state (see FIG. 2A), the control unit 8 starts the engine 1 in the manner where: the control unit 8 controls the clutch 3 to turn to be in the engaged state in order to input the driving force generated by the motor generator 6 to the engine 1 via the clutch 3; and then, the engine 1 is cranked to start (an engine start/drive mode). Accordingly, as is not with the case with a known technology, a cell motor does not need to be actuated. On the other hand, the driving force generated by the motor generator 6 is also inputted to the automatic transmission apparatus 7 via the torque converter 2 (the fluid or the lock-up clutch 2e), so that the driving force generated by the motor generator 6 also serves as a driving force for driving the vehicle. The driving force, which is generated by staring the engine 1, is inputted to the automatic transmission apparatus 7 via the clutch 3, the one-way clutch 4 and the lock-up clutch 2e, so that the driving force of the engine 1 drives the vehicle together with the driving force generated by the motor generator 6.

<3. Regeneration Mode>

Referring to FIG. 3, in a case where the driving force becomes not necessary while the vehicle travels by the engine operation (see FIG. 2B) (i.e. in a case where the driver releases an acceleration pedal (acceleration off)), the control unit 8 controls the clutch 3 to be released (i.e. the disengaged state), thereby stopping the engine 1 in a process of transiting to the regeneration mode. Accordingly, a reverse driving force, which is inputted from the vehicle (i.e. wheels), is inputted to the motor generator 6 via the lock-up clutch 2e, so that the reverse driving force is regenerated without being absorbed by the engine 1. Furthermore, because the engine 1 is stopped, fuel consumption of the vehicle may be improved.

<4. Re-Acceleration Mode>

Figure 3B:
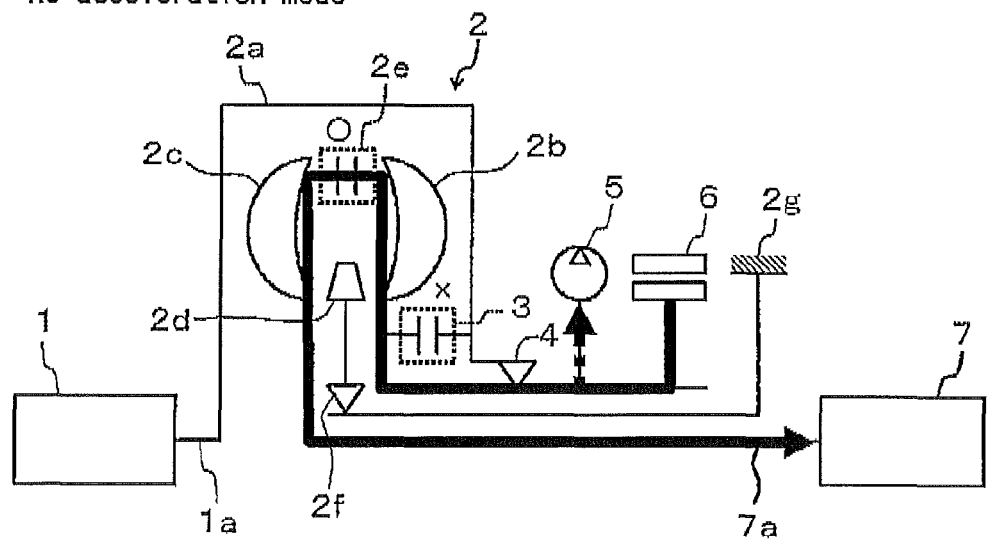
FIG. 3B is a diagram illustrating a torque flow in a case where the hybrid drive device according to the first embodiment is in a re-acceleration mode.

Referring to FIG. 3B, in a case where the vehicle is again accelerated from the state where the vehicle is in the regeneration mode (see FIG. 3A), the control unit 8 drives the motor generator 6 in order to input the driving force generated by the motor generator 6 to the automatic transmission apparatus 7 via the torque converter 2 (i.e. the fluid or the lock-up clutch 2e) (a re-acceleration mode). Accordingly, the vehicle is re-accelerated. In this case, the clutch 3 is turned to be in the engaged state if necessary, so that the engine 1 is started in order to re-accelerate the vehicle by using the driving force generated by the engine 1 and the driving force generated by the motor generator 6.

<5. Engine Start Mode>

Figure 4A:
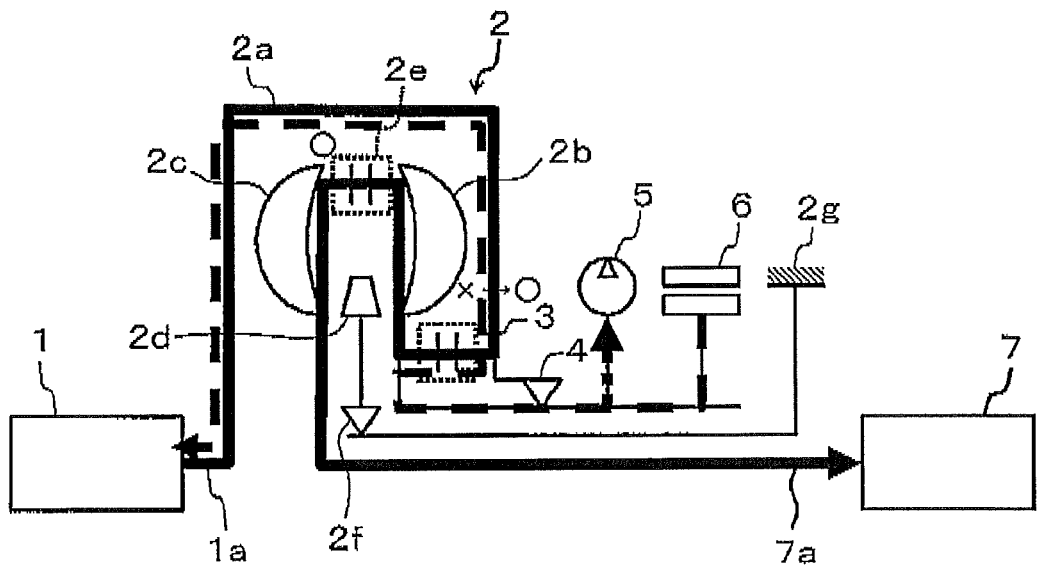
FIG. 4A is a diagram illustrating a torque flow in a case where the hybrid drive device according to the first embodiment is in an engine start mode.

Referring to FIG. 4A, in a case where a power stored within the battery 9 is insufficient while the vehicle is stopped and the vehicle is not started to move by the motor generator 6 (however, the engine 1 is startable), the control unit 8 rotates the motor generator 6 in the starting process in order to drive the transmission oil pump 5. Then, after a sufficient hydraulic pressure is ensured, the control unit 8 controls the clutch 3 to be in the engaged state, so that the engine 1 is started (an engine start mode). Then, the driving force generated by the engine 1 is inputted to the automatic transmission apparatus 7 via the clutch 3; the one-way clutch 4 and the torque converter 2 (i.e. the fluid or the lock-up clutch 2e). As a result, the vehicle starts moving.

<6. EV Start Incapable Mode>

Figure 4B:
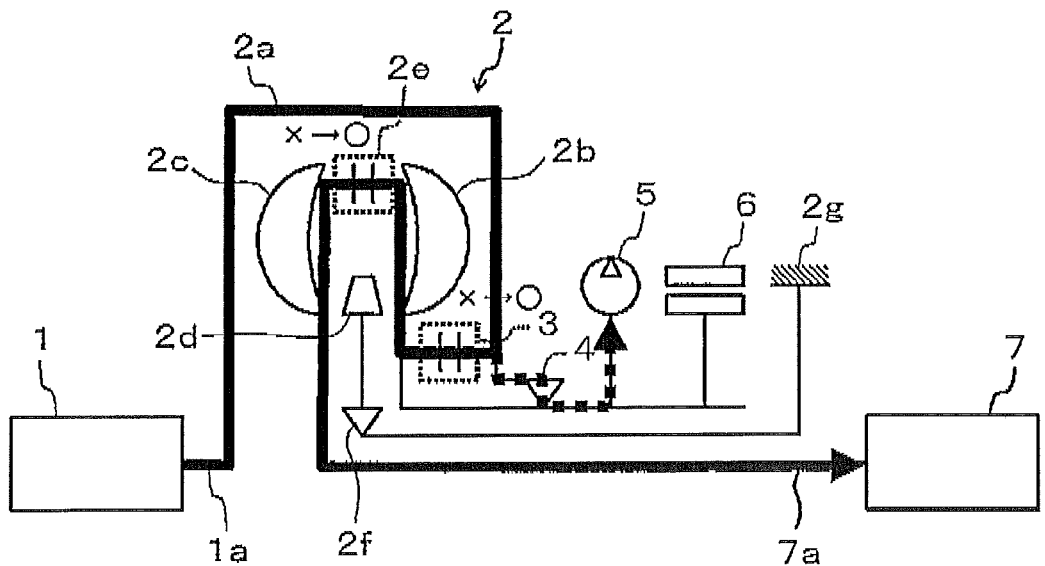
FIG. 4B is a diagram illustrating a torque flow in a case where the hybrid drive device according to the first embodiment is in an EV start incapable mode.

Referring to FIG. 4B, the control unit 8 starts the engine 1 by means of the cell motor in the starting process, so that the driving force generated by the engine 1 is inputted to the transmission oil pump 5 via the one-way clutch 4. Then, after a sufficient hydraulic pressure is ensured, the driving force is inputted to the automatic transmission apparatus 7 via the clutch 3, the one-way clutch 4 and the torque converter 2 (i.e. the fluid or the lock-up clutch 2e). Accordingly, the vehicle again starts moving without depending on the motor generator 6 (an EV start incapable mode).

According to the first embodiment, the engine torque vibration may be attenuated by the fluid, which is fully accommodated within the torque converter 2, and the general lock-up damper. Therefore, a damper mechanism does not need to be newly added. Furthermore, a relatively large space for mounting the hybrid drive device does not need to be prepared. In other words, a down-size of the hybrid drive device may be achieved. Additionally, manufacturing costs of the hydraulic drive device may be reduced. Furthermore, according to the first embodiment, the transmission oil pump 5 is actuated by any means of the engine 1 and the motor generator 6 in any condition by combining the disengaged state and the engaged state of the clutch 3 and the disengaged state and the engaged state of the lock-up clutch 2e. Therefore, even in a case where the driving force by the motor generator 6 is not likely to be obtained, the vehicle may be immediately started to move. Furthermore, when starting the vehicle, the automatic transmission apparatus 7 is controlled so as to establish the starting stage and the lock-up clutch 2e is preliminarily turned to be in the engaged state, so that the loss of the driving force, which is likely to occur when starting the vehicle, is reduced, thereby improving the fuel consumption.

Second Embodiment

A second embodiment of a hybrid drive device will be described below in accordance with the attached drawings. Illustrated in FIG. 5 is a diagram of schematic configuration of the hybrid drive device according to the second embodiment.

The hybrid drive device according to the second embodiment differs from the hybrid drive device according to the first embodiment in that the hybrid drive device according to the second embodiment includes a two-way clutch 11 (i.e. a switch-type free wheel, a first clutch mechanism), which is configured so as to switch directions of a power transmission, instead of the clutch 3 and the one-way clutch 4 of the first embodiment. Hence, in the second embodiment, only the differences between the first embodiment and the second embodiment will be described.

The two-way clutch 11 is the switch-type free-wheel that is configured so as to switch a state thereof into a first mode and a second mode. The first mode refers to a mode in which a torque generated by the engine 1 (i.e. the torque converter housing 2a) is transmitted only to the pump impeller 2b and the motor generator 6 from the torque converter housing 2a. The second mode refers to a mode in which a torque generated at the pump impeller 2b and the motor generator 6 is transmitted only to the torque converter housing 2a from the pump impeller 2b and the motor generator 6. The two-way clutch 11 is controlled by the control unit 8 so that the two-way clutch 11 switches the first mode and the second mode.

An operation of the hybrid drive device according to the second embodiment will be described below with reference to the drawings. Illustrated in FIGS. 6 to 8 are diagrams of a torque flow established in response to an operation mode of the hybrid drive device according to the second embodiment.

<1. EV Start/EV Drive Mode>

Figure 6A:
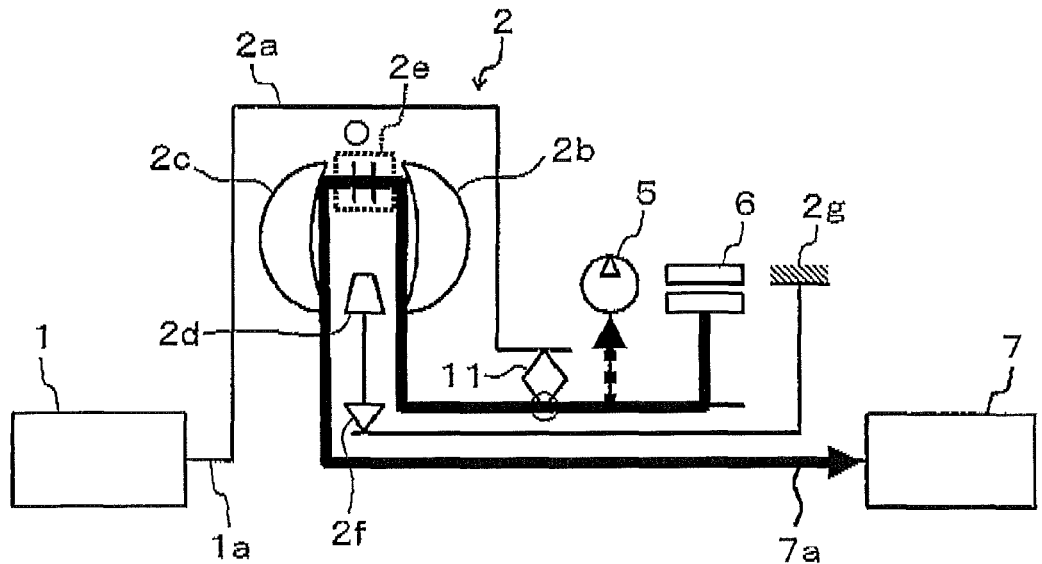
FIG. 6A is a diagram illustrating a torque flow in a case where the hybrid drive device according to the second embodiment is in the EV start/EV drive mode.

Referring to FIG. 6A, in the EV start/EV drive mode (i.e. in the starting and driving process of the hybrid drive device by the electricity supplied thereto (i.e. by means of the motor) while the engine 1 is in the stopped state), the control unit 8 firstly rotates the motor generator 6 in order to actuate the transmission oil pump 5. The control unit 8 controls the automatic transmission apparatus 7 in order to establish the starting stage by means of the hydraulic pressure generated by the transmission oil pump 5. The driving force generated by the motor generator 6 is transmitted to the automatic transmission apparatus 7 via the fluid accommodated within the torque converter 2. Accordingly, the vehicle starts moving. Shortly after, the control unit 8 controls the lock-up clutch 2e so as to be in the engaged state. Accordingly, the driving output generated by the motor generator 6 is transmitted to the automatic transmission apparatus 7 without causing a fluid loss. In this case, the two-way clutch 11 establishes the second mode so that the power is not transmitted from the pump impeller 2b to the torque converter housing 2a.

<2. Engine Start/Drive Mode>

Figure 6B:
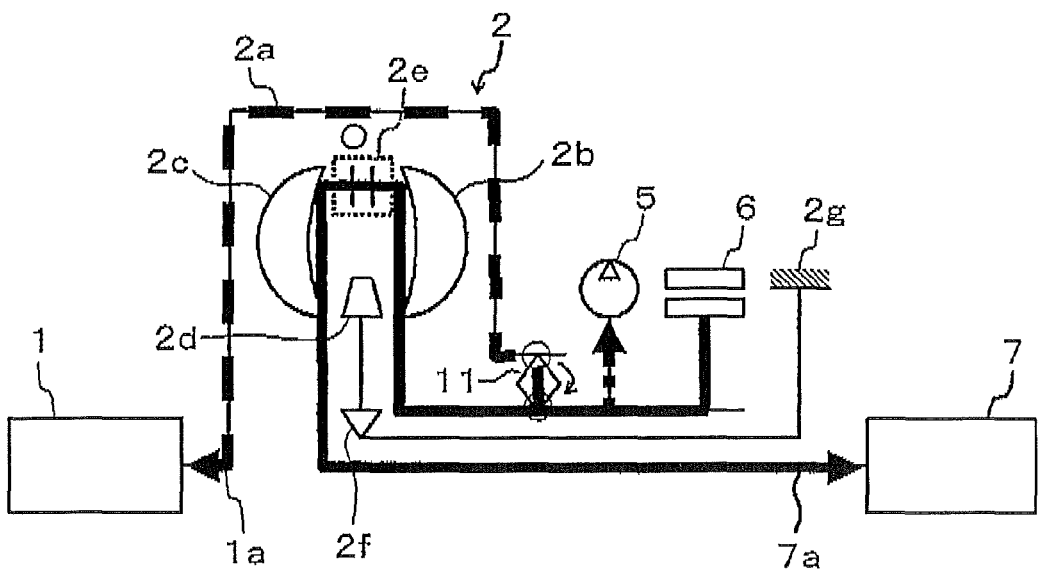
FIG. 6B is a diagram illustrating a torque flow in a case where the hybrid drive device according to the second embodiment is in the engine start/drive mode.

Referring to FIG. 6B, in the case where the driving force by the engine 1 becomes necessary while the vehicle is in the EV drive state (see FIG. 2A), the control unit 8 controls the two-way clutch 11 to establish the second mode, so that the torque is transmitted from the pump impeller 2b to the torque converter housing 2a (i.e. the engine start/drive mode). Accordingly, the driving force generated by the motor generator 6 is inputted to the engine 1 via the two-way clutch 11, thereby cranking and starting the engine 1. Therefore, the cell motor does not need to be actuated. Additionally, the driving force generated by the motor generator 6 is inputted to the automatic transmission apparatus 7 via the torque converter 2 (i.e. the fluid or the lock-up clutch 2e), so that the driving force generated by the motor generator 6 also serves as the driving force for driving the vehicle. Additionally, after the engine 1 is started, the two-way clutch 11 establishes the first mode, in which the torque is transmitted from the torque converter housing 2a to the pump impeller 2b, so that the driving force generated by the engine 1 is transmitted to the automatic transmission apparatus 7.

<3. Regeneration Mode>

Figure 7A:
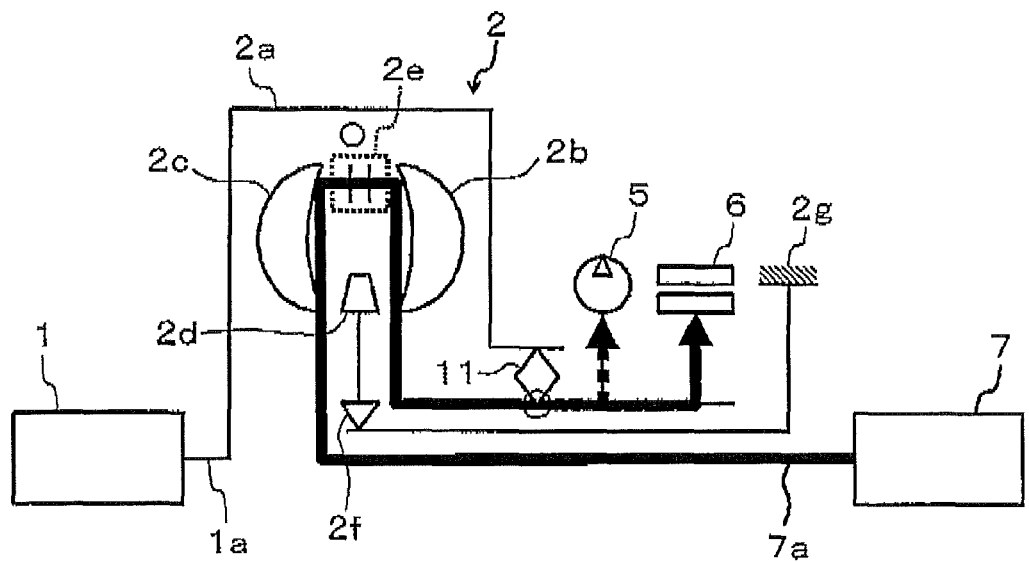
FIG. 7A is a diagram illustrating a torque flow in a case where the hybrid drive device according to the second embodiment is in the regeneration mode.

Referring to FIG. 7A, in the case where driving force becomes not necessary while the vehicle travels by the engine operation (see FIG. 6B) (i.e. in the case where the driver releases the acceleration pedal (acceleration off)), the control unit 8 controls the two-way clutch 11 so that the two-way clutch 11 establishes the first mode, in which the torque is not transmitted from the pump impeller 2b to the torque converter housing 2a, thereby stopping the engine 1 in the process of transiting to the regeneration mode. Accordingly, the reverse driving force, which is inputted from the vehicle (i.e. the wheels), is inputted to the motor generator 6 via the lock-up clutch 2e, so that the reverse driving force is regenerated without being absorbed by the engine 1. Furthermore, because the engine 1 is stopped, the fuel consumption of the vehicle may be improved.

<4. Re-Acceleration Mode>

Figure 7B:
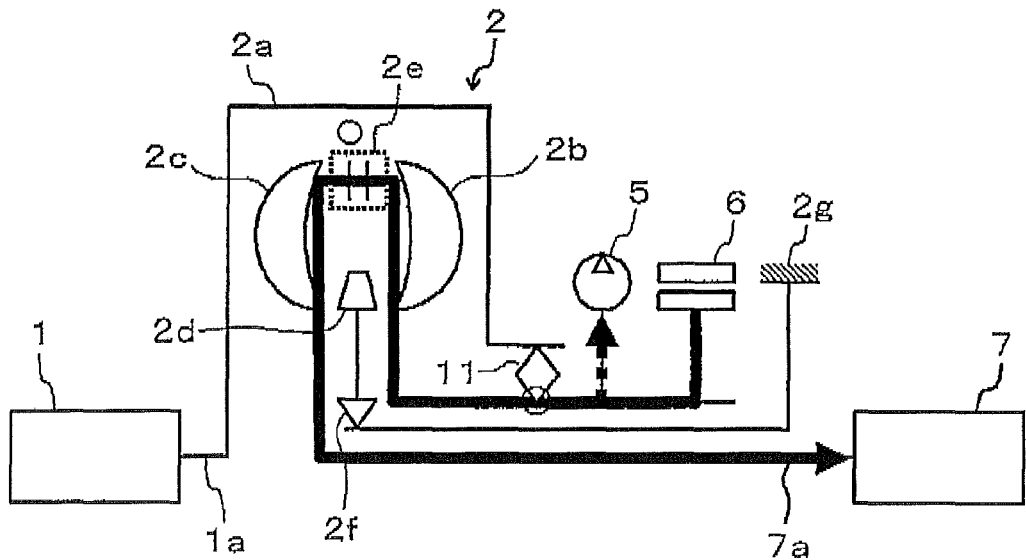
FIG. 7B is a diagram illustrating a torque flow in a case where the hybrid drive device according to the second embodiment is in the re-acceleration mode.

Referring to FIG. 7B, in the case where the vehicle is again accelerated from the state where the vehicle is in the regeneration state (see FIG. 3A), the control unit 8 drives the motor generator 6 in order to input the driving force generated by the motor generator 6 to the automatic transmission apparatus 7 via the torque converter 2 (i.e. the fluid or the lock-up clutch 2e) (i.e. the re-acceleration mode). Accordingly, the vehicle is re-accelerated. In this case, the control unit 8 controls the two-way clutch 11 to establish the second mode, in which the torque is transmitted from the pump impeller 2b to the torque converter housing 2a, if necessary, so that the engine 1 is started in order to re-accelerate the vehicle by using the driving force generated by the engine 1 and the driving force generated by the motor generator 6.

<5. Engine Start Mode>

Figure 8A:
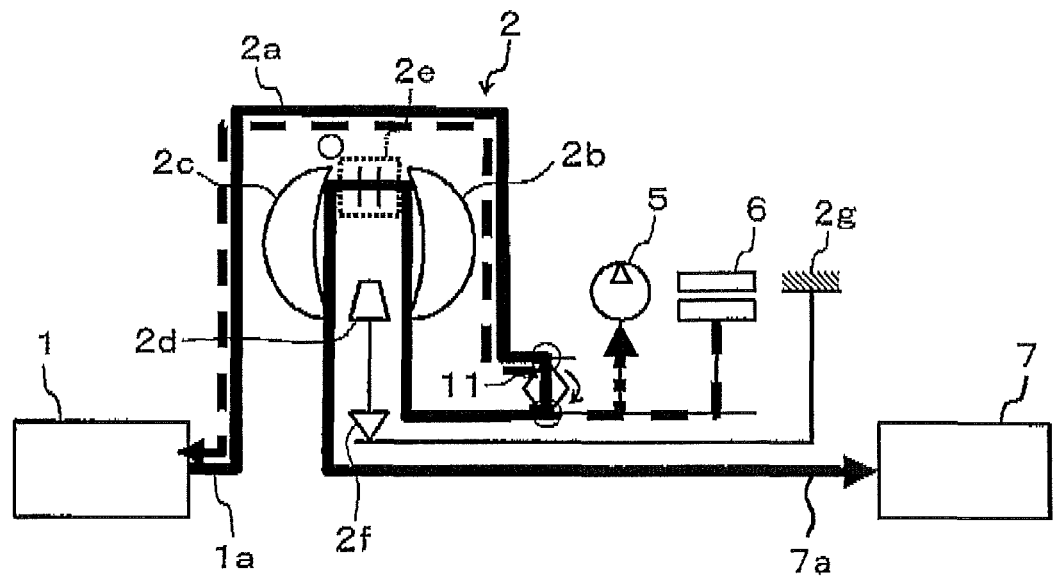
FIG. 8A is a diagram illustrating a torque flow in a case where the hybrid drive device according to the second embodiment is in the engine start mode.

Referring to FIG. 8A, in the case where the power stored within the battery 9 is insufficient while the vehicle is stopped and the vehicle is not started to move by the motor generator 6 (however, the engine 1 is startable), the control unit 8 controls the two-way clutch 11 to establish the second mode, in which the torque is transmitted from the pump impeller 2b to the torque converter housing 2a, in order to rotate the motor generator 6 (i.e. the engine start mode). Accordingly, the engine 1 is started with less electric power. After the engine 1 is started, the control unit 8 controls the two-way clutch 11 in order to establish the first mode, in which the torque is transmitted from the torque converter housing 2a to the pump impeller 2b. Accordingly, the driving force generated by the engine 1 is inputted to the automatic transmission apparatus 7 via the two-way clutch 11 and the torque converter 2 (i.e. the fluid or the lock-up clutch 2e), so that the vehicle starts moving.

<6. EV Start Incapable Mode>

Figure 8B:
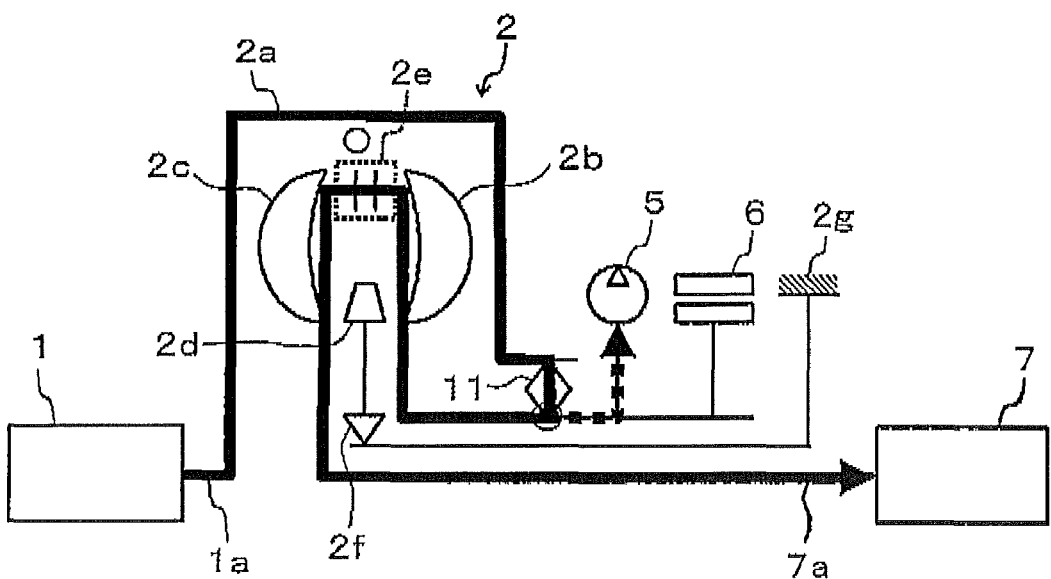
FIG. 8B is a diagram illustrating a torque flow in a case where the hybrid drive device according to the second embodiment is in the EV start incapable mode.

Referring to FIG. 8B, the control unit 8 controls the two-way clutch 11 to establish the first mode, in which the driving force is transmitted from the torque converter housing 2a to the pump impeller 2b, in the starting process, so that the engine 1 is started by means of the cell motor (i.e. the EV start incapable mode). Accordingly, the transmission oil pump 5 is actuated and a sufficient hydraulic pressure is to be ensured. Then, the driving force is transmitted to the automatic transmission apparatus 7 via the two-way clutch 11 and the torque converter 2 (i.e. the fluid or the lock-up clutch 2e). Accordingly, the vehicle is re-started to move without depending on the motor generator 6.

According to the second embodiment, advantages and effects similar to the first embodiment are achievable. Furthermore, because the hybrid drive device according to the second embodiment uses the two-way clutch 11, a size of the hybrid drive device according to the second embodiment is further reduced when comparing to the hybrid drive device according to the first embodiment.

Third Embodiment

Figure 9:
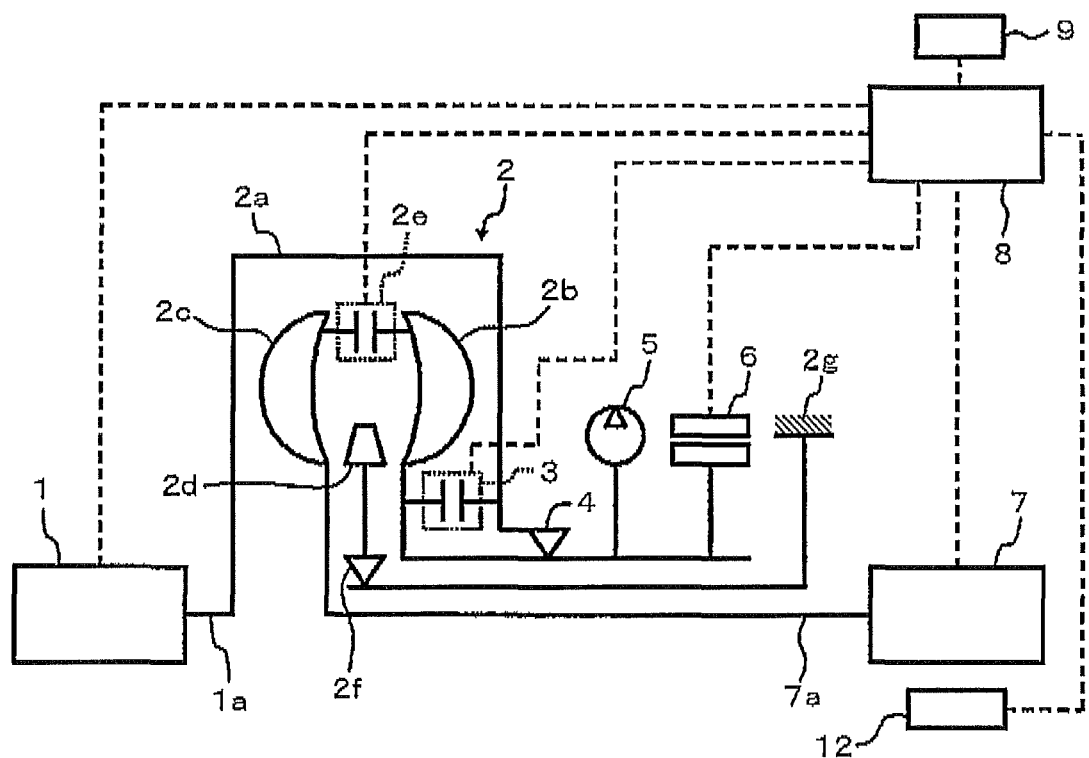
FIG. 9 is a diagram schematically illustrating a configuration of a hybrid drive device according to a third embodiment.

A third embodiment of a hybrid drive device will be described below with reference to the attached drawing. Illustrated in FIG. 9 is a schematic diagram of a configuration example of the hybrid drive device according to the third embodiment.

The hybrid drive device according to the third embodiment differs from the hybrid drive device according to the first embodiment in that the hybrid drive device according to the third embodiment further includes an auxiliary electric oil pump 12, which is configured so as to be actuated even in a case where the engine 1, the motor generator 6 and the vehicle are stopped. Other configurations of the hybrid drive device according to the third embodiment are similar to the hybrid drive device according to the first embodiment. Therefore, only the difference between the third embodiment and the first embodiment will be described below. Additionally, the auxiliary electric oil pump 12 may be adapted to the hybrid drive device according to the second embodiment.

The auxiliary electric oil pump 12 is an oil pump, which is actuated by an electric power. The auxiliary electric oil pump 12 is provided at the hybrid drive device in order to assist the transmission oil pump 5. As is the case with the transmission oil pump 5, the auxiliary electric oil pump 12 also generates a hydraulic pressure for actuating mainly the friction elements used for establishing the gear stages in the automatic transmission apparatus 7. Furthermore, the auxiliary electric oil pump 12 generates the hydraulic pressure for actuating the clutch 3 and the lock-up clutch 2e. Additionally, the auxiliary electric oil pump 12 is controlled by the control unit 8.

An operation of the hybrid drive device according to the third embodiment will be described below.

<1. EV Start/EV Drive Mode>

In the EV start/EV drive mode, the control unit 8 firstly actuates the auxiliary electric oil pump 12 while the vehicle is in the stopped state in order to establish the staring stage at the automatic transmission apparatus 7 in response to the hydraulic pressure generated by the auxiliary electric oil pump 12. Then, the control unit 8 rotates the motor generator 6 in the starting process in order to transmit the driving force generated by the motor generator 6 to the automatic transmission apparatus 7 via the torque converter 2 (i.e. the fluid or the lock-up clutch 2e), thereby driving the vehicle. Furthermore, in this case, because the transmission oil pump 5 is actuated in response to the rotation of the motor generator 6, the auxiliary electric oil pump 12 may be stopped. In this case, the lock-up clutch 2e may be preliminarily turned to be in the engaged state, so that the driving force generated by the motor generator 6 is inputted to the automatic transmission apparatus 7 via the lock-up clutch 2e, which may result in improving the fuel consumption when comparing to the case where the driving force is transmitted to the automatic transmission apparatus 7 via the fluid.

<2. Engine Start Mode>

In the case where the electric power stored at the battery 9 is not sufficient and the vehicle is not likely to be started by the motor generator 6 (however, the engine 1 is startable) while the vehicle is stopped, the control unit 8 preliminarily controls the clutch 3 to be in the engaged state by means of the hydraulic pressure, which is generated by the auxiliary electric oil pump 12, in the starting process, so that the driving force generated by the motor generator 6 is inputted to the engine 1, thereby starting the engine 1 (i.e. the engine start mode). Then, the driving force generated by the engine 1 is inputted to the automatic transmission apparatus 7 via the clutch 3, the one-way clutch 4 and the torque converter 2 (i.e. the fluid or the lock-up clutch 2e). As a result, the vehicle starts moving.

According to the third embodiment, advantages and effects similar to the first embodiment are achievable. Furthermore, because the hybrid drive device according to the third embodiment includes the auxiliary electric oil pump 12, the automatic transmission apparatus 7 preliminarily establishes the starting stage and the clutch 3 is preliminarily turned to be in the engaged state when starting the engine 1 when starting to move the vehicle. Therefore, a responsiveness of the hybrid drive device is further improved.

Fourth Embodiment

A fourth embodiment of a hybrid drive device will be described below with reference to the attached drawing. Illustrated in FIG. 10 is a schematic diagram of a configuration example of the hybrid drive device according to the fourth embodiment.

The hybrid drive device according to the fourth embodiment differs from the hybrid drive device according to the first embodiment in that the hybrid drive device according to the fourth embodiment further includes an auxiliary motor 13 and a one-way clutch 14 (a second one-way clutch). The auxiliary motor 13 auxiliary drives the transmission oil pump 5 even in the case where the engine 1, the motor generator 6 and the vehicle are stopped. The one-way clutch 14 does not transmit a driving force generated by the auxiliary motor 13 (the transmission oil pump 5) to the pump impeller 2b and the motor generator 6. Furthermore, the one-way clutch 14 is arranged on the power transmission path between the pump impeller 2b and the motor generator 6 on the one hand and the transmission oil pump 5 on the other. Other configurations of the hybrid drive device according to the fourth embodiment are similar to the first embodiment. Therefore, only the differences between the fourth embodiment and the first embodiment will be described below. Additionally, the auxiliary motor 13 and the one-way clutch 14 may be adapted to the hybrid drive device according to the second embodiment.

The auxiliary motor 13 is a motor that auxiliary actuates the transmission oil pump 5. Additionally, the auxiliary motor 13 is controlled by the control unit 8.

The one-way clutch 14 is a free wheel that is configured so as not to transmit the driving force generated by the auxiliary motor 13 (the transmission oil pump 5) to the pump impeller 2b and the motor generator 6 and so as to transmit the driving force generated by the pump impeller 2b and the motor generator 6 to the transmission oil pump 5.

An operation of the hybrid drive device according to the fourth embodiment will be described below.

<1. EV Start/EV Drive Mode>

In the EV start/EV drive mode, the control unit 8 firstly actuates the auxiliary motor 13 while the vehicle is in the stopped state in order to establish the staring stage at the automatic transmission apparatus 7 in response to the hydraulic pressure generated by the transmission oil pump 5. In this case, the rotational force inputted to the transmission oil pump 5 from the auxiliary motor 13 is not transmitted to the pump impeller 2b and the motor generator 6 because of the one-way clutch 14. Then, in the starting process, the control unit 8 rotates the motor generator 6 in order to transmit the driving force generated by the motor generator 6 to the automatic transmission apparatus 7 via the torque converter 2 (i.e. the fluid or the lock-up clutch 2e), thereby driving the vehicle. Furthermore, in this case, the transmission oil pump 5 is actuated in response to the rotation of the motor generator 6 via the one-way clutch 14. Therefore, the auxiliary motor 13 may be stopped. Furthermore, in this case, the lock-up clutch 2e may be preliminarily turned to be in the engaged state, so that the driving force generated by the motor generator 6 is inputted to the automatic transmission apparatus 7 via the lock-up clutch 2e. Accordingly, the fuel consumption may be improved when comparing to the case where the driving force is transmitted to the automatic transmission apparatus 7 via the fluid.

<2. Engine Start Mode>

In the case where the electric power stored at the battery 9 is not sufficient and the vehicle is not likely to be started by the motor generator 6 (however, the engine 1 is startable) while the vehicle is stopped, the control unit 8 drives the auxiliary motor 13 in the starting process and controls the clutch 3 to be preliminarily in the engaged state by means of the hydraulic pressure generated by the transmission oil pump 5 (i.e. the engine start mode). Accordingly, the driving force generated by the motor generator 6 is inputted to the engine 1, thereby starting the engine 1. Then, the driving force generated by the engine 1 is inputted to the automatic transmission apparatus 7 via the clutch 3, the one-way clutch 4 and the torque converter 2 (i.e. the fluid or the lock-up clutch 2e). As a result, the vehicle starts moving.

According to the fourth embodiment, advantages and effects similar to the first embodiment are achievable. Furthermore, because the hybrid drive device according to the fourth embodiment includes the auxiliary motor 13, the starting stage may be preliminarily established at the automatic transmission apparatus 7 when starting the vehicle, and the clutch 3 may be preliminarily turned to be in the engaged state when starting the engine 1. Accordingly, the responsiveness of the hybrid drive device according to the fourth embodiment may be further improved.

Fifth Embodiment

A fifth embodiment of a hybrid drive device will be described below with reference to the attached drawings. Illustrated in FIG. 11 is a schematic diagram of a configuration example of the hybrid drive device according to the fifth embodiment.

Figure 11:
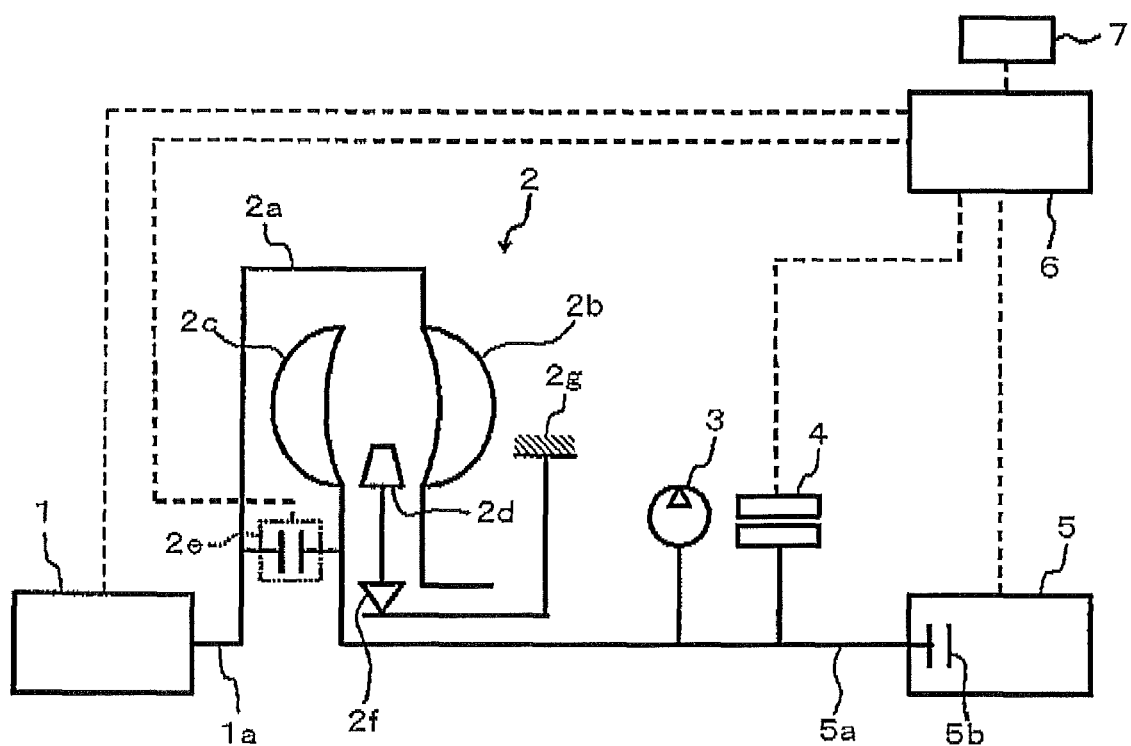
FIG. 11 is a diagram schematically illustrating a configuration of a hybrid drive device according to a fifth embodiment.

Referring to FIG. 11, the hybrid drive device according to the fifth embodiment differs from the hybrid drive device according to the first embodiment in that the hybrid drive device according to the fifth embodiment does not include the clutch 3 and the one-way clutch 4. Hence, only the difference between the hybrid drive device according to the fifth embodiment and the hybrid drive device according to the first embodiment will be described below.

The torque converter housing 2a of the hybrid drive device according to the fifth embodiment is connected to the output shaft 1a of the engine 1 and the pump impeller 2b, so that the torque converter housing 2a is integrally rotated with the output shaft 1a and the pump impeller 2b.

The pump impeller 2b is the impeller for transmitting the hydraulic pressure to the turbine impeller 2c. Furthermore, the pump impeller 2b is normally fixed at the torque converter housing 2a, which is connected to the output shaft 1a of the engine 1.

The turbine impeller 2c is the impeller that is rotated when receiving the hydraulic pressure from the pump impeller 2b. The turbine impeller 2c is connected to the input shaft 7a of the automatic transmission apparatus 7. Furthermore, the turbine impeller 2c is normally fixed at the transmission oil pump 5 and the motor generator 6 (the rotor).

The lock-up clutch 2e is connected to the fluid-type transmitting mechanism, which is configured by the pump impeller 2b and the turbine impeller 2c, in parallel. Furthermore, the one end portion of the lock-up clutch 2e is connected to the pump impeller 2b via the torque converter housing 2a, and the other end portion of the lock-up clutch 2e is connected to the turbine impeller 2c.

The transmission oil pump 5 is a pump that generates the hydraulic pressure for mainly actuating the friction elements (including a clutch 7b) used for establishing the gear stages at the automatic transmission apparatus 7. Additionally, the transmission oil pump 5 generates the hydraulic pressure for actuating the lock-up clutch 2e. The transmission oil pump 5 is normally fixed at the turbine impeller 2c, the motor generator 6 and the input shaft 7a of the automatic transmission apparatus 7, so that the transmission oil pump 5 integrally rotates with the turbine impeller 2c, the motor generator 6 and the input shaft 7a. Furthermore, the transmission oil pump 5 is configured so as to certainly rotate when the motor generator 6 is rotated.

The motor generator 6 is normally fixed at the turbine impeller 2c, the transmission oil pump 5 and the input shaft 7a of the automatic transmission apparatus 7, so that the motor generator 6 integrally rotates with the turbine impeller 2c, the transmission oil pump 5 and the input shaft 7a. Additionally, the motor generator 6 is controlled by the control unit 8.

The automatic transmission apparatus 7 is the transmission apparatus that automatically executes the starting operation and the shifting operation. The automatic transmission apparatus 7 includes the input shaft 7a into which the rotational force generated by the turbine impeller 2c is inputted. Furthermore, the automatic transmission apparatus 7 includes plural planetary gears for configuring gear stages, the friction elements for disengaging/engaging rotational elements of respective plural planetary gears and hydraulic passages for actuating the respective friction elements. The friction elements of the automatic transmission apparatus 7 are serve as a clutch 7b for interrupting/establishing a transmission of the rotational power from the input shaft 7a (the turbine impeller 2c). The automatic transmission apparatus 7 receives the hydraulic pressure generated by the transmission oil pump 5. Furthermore, the automatic transmission apparatus 7 includes various actuators on the hydraulic passages for switching oil passages and for adjusting the hydraulic pressure. The hydraulic passages of the automatic transmission apparatus 7 supply the hydraulic pressure, which is used for actuating the lock-up clutch 2e, so as to be switchable and adjustable. Additionally, the automatic transmission apparatus 7 is controlled by the control unit 8.

The control unit 8 is a computing device that controls the operations of the engine 1, the lock-up clutch 2e, the motor generator 6 and the automatic transmission apparatus 7. The control unit 8 is electrically connected to the battery 9.

An operation of the hybrid drive device according to the fifth embodiment will be described below with reference to the attached drawings. Illustrated in FIGS. 2 to 4 are diagrams of a torque flow established in response to the operation mode of the hybrid drive device according to the fifth embodiment.

<1. EV Start/EV Drive Mode>

Figure 12:
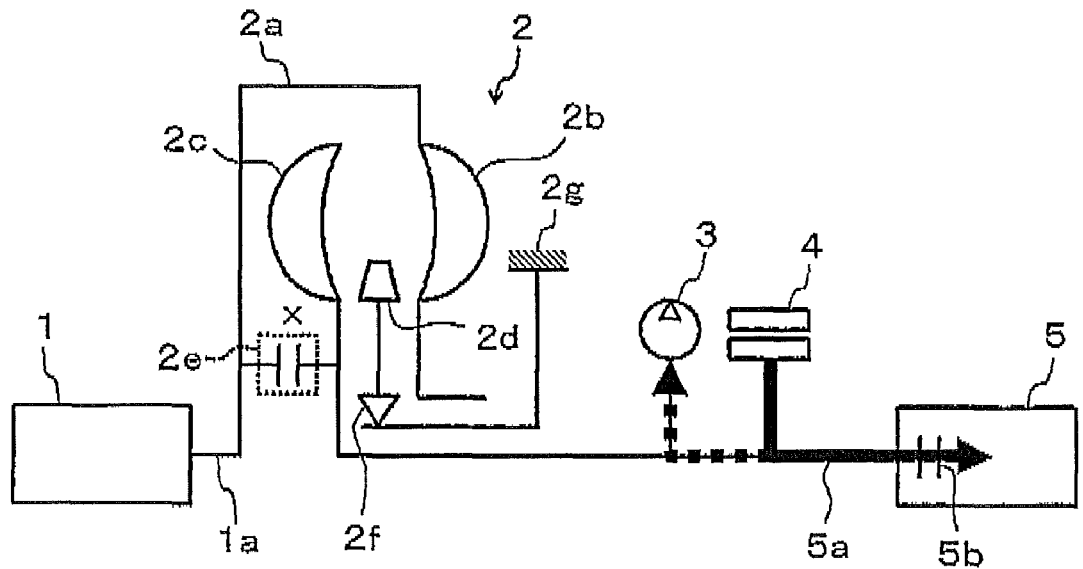
FIG. 12A is a diagram illustrating a torque flow in a case where the hybrid drive device according to the fifth embodiment is in the EV start/EV drive mode.
FIG. 12B is a diagram illustrating a torque flow in a case where the hybrid drive device according to the fifth embodiment is in the engine start/drive mode.
Figure 12:
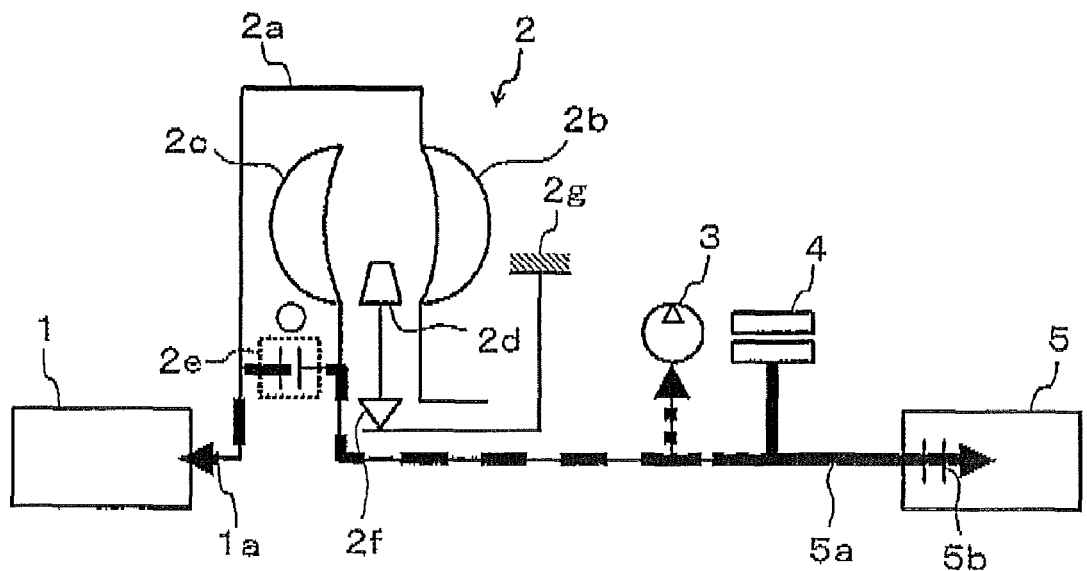

Referring to FIG. 12A, in the EV start/EV drive mode (i.e. in the starting and driving process of the hybrid drive device by the electricity supplied thereto (i.e. by means of the motor) while the engine 1 is in the stopped state), the control unit 8 firstly rotates the motor generator 6 in order to actuate the transmission oil pump 5. The control unit 8 controls the automatic transmission apparatus 7 to establish the starting stage by means of the hydraulic pressure generated by the transmission oil pump 5 (i.e. in this case, the clutch 7b is turned to be in an engaged state). The driving force generated by the motor generator 6 is transmitted to the automatic transmission apparatus 7 via the clutch 7b. Accordingly, the vehicle starts moving. In this case, the clutch 7b is used as the friction elements for establishing the staring stage.

<2. Engine Start/Drive Mode>

Referring to FIG. 126, in the case where the driving force by the engine 1 becomes necessary while the vehicle is in the EV drive mode (see FIG. 2A), the control unit 8 controls the lock-up clutch 2e to be in the engaged state, so that the driving force generated by the motor generator 6 is inputted to the engine 1 via the lock-up clutch 2e, thereby cranking and starting the engine 1 (i.e. the engine start/drive mode). Accordingly, a starter motor for starting the engine 1 does not need to be provided at the hybrid drive device. The driving force generated by the engine 1 is inputted to the automatic transmission apparatus 7 via the torque converter 2 (i.e. the fluid or the lock-up clutch 2e), thereby driving the vehicle together with the motor generator 6.

<3. Regeneration Mode>

Figure 13:
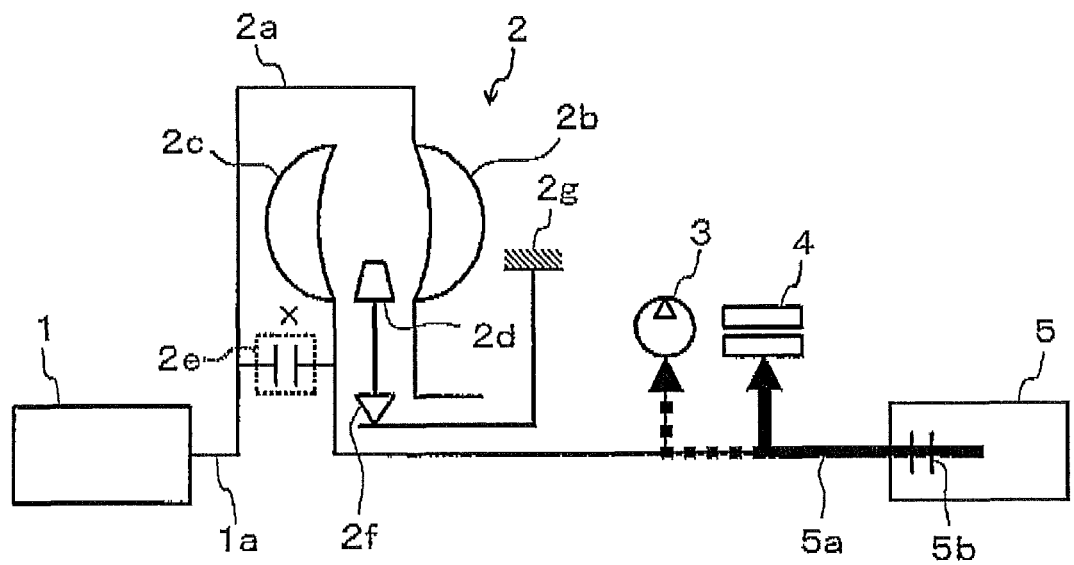
FIG. 13A is a diagram illustrating a torque flow in a case where the hybrid drive device according to the fifth embodiment is in the regeneration mode.
FIG. 13B is a diagram illustrating a torque flow in a case where the hybrid drive device according to the fifth embodiment is in the re-acceleration mode.
Figure 13:
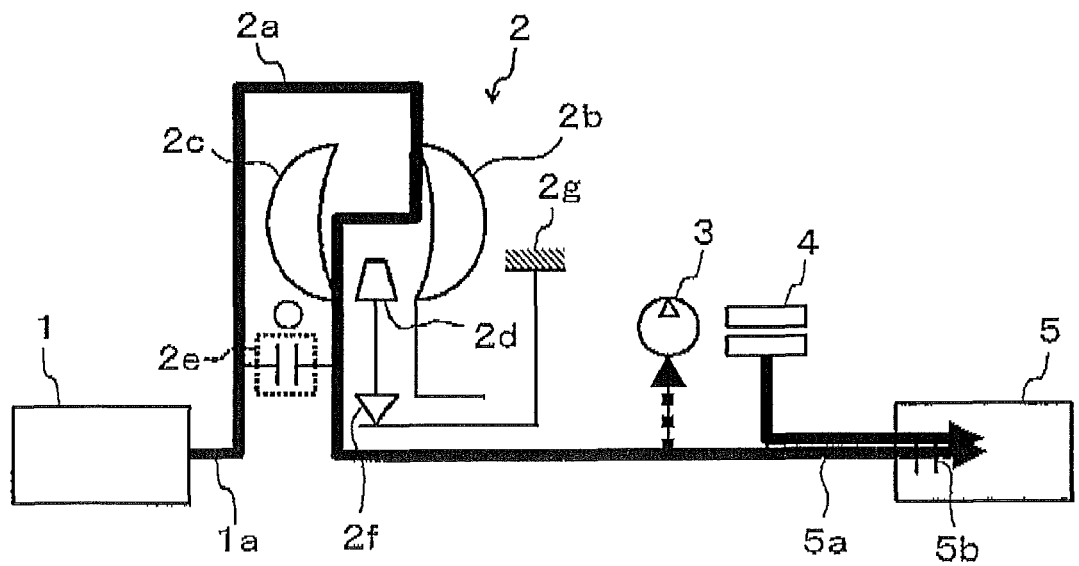

Referring to FIG. 13A, in the case where the driving force becomes not necessary while the vehicle travels by the engine operation (see FIG. 12B) (i.e. in the case where the driver releases the acceleration pedal (acceleration off)), the control unit 8 controls the lock-up clutch 2e to be released (i.e. the disengaged state) in the process of transiting to the regeneration mode, thereby stopping the engine 1. Accordingly, the reverse driving force, which is inputted from the vehicle, is regenerated at the motor generator 6 without being absorbed by the engine 1. Furthermore, because the engine 1 is stopped, the fuel consumption of the vehicle may be improved.

<4. Re-Acceleration Mode>

Referring to FIG. 13B, in the case where the vehicle is again accelerated from the state where the vehicle is in the regeneration mode (see FIG. 13A), the control unit 8 drives the motor generator 6 in order to input the driving force generated by the motor generator 6 to the transmission apparatus 7 via the clutch 7b (i.e. the re-acceleration mode). Accordingly, the vehicle is re-accelerated. In this case, the lock-up clutch 2e is turned to be in the engaged state if necessary, so that the engine 1 is started in order to re-accelerate the vehicle by using the driving force generated by the engine 1 and the driving force generated by the motor generator 6.

<5. Engine Start Mode>

Figure 14:
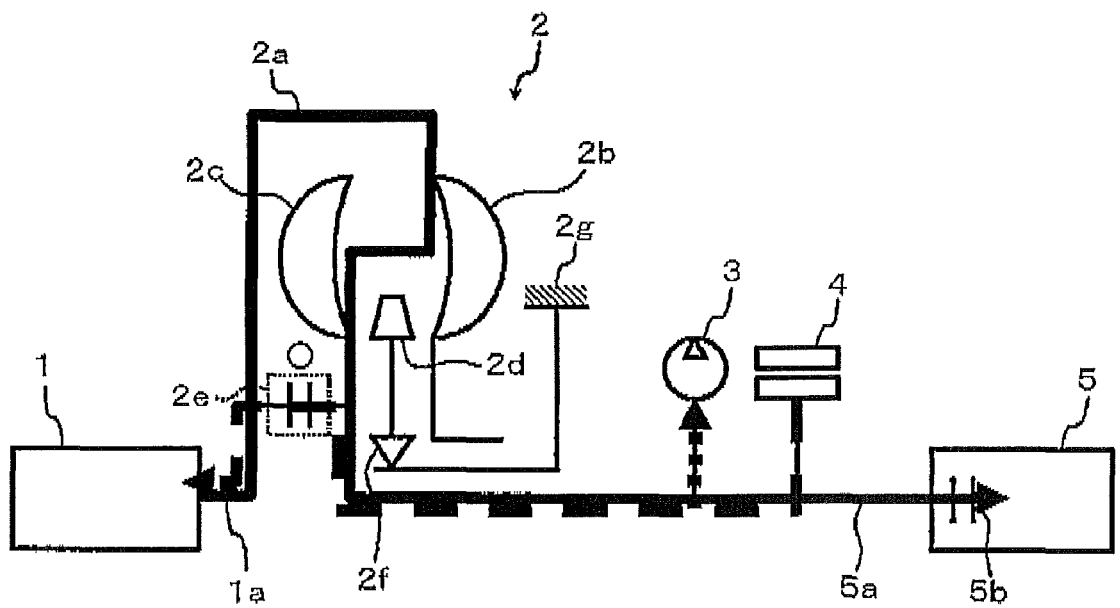
FIG. 14 is a diagram illustrating a torque flow in a case where the hybrid drive device according to the fifth embodiment is in the engine start mode.

Referring to FIG. 14, in the case where the power stored within the battery 9 is insufficient while the vehicle is stopped and the vehicle is not started to move by the motor generator 6 (however, the engine 1 is startable), the control unit 8 controls the clutch 7b to be released (i.e. the disengaged state), and then, rotates the motor generator 6 in order to actuate the transmission oil pump 5 in the starting process. Then, after a sufficient hydraulic pressure is ensured, the control unit 8 controls the lock-up clutch 2e to be in the engaged state, thereby starting the engine 1 (i.e. the engine start mode). Then, the driving force generated by the engine 1 is inputted to the automatic transmission apparatus 7 via the torque converter 2 (i.e. the fluid or the lock-up clutch 2e), thereby starting the vehicle.

According to the fifth embodiment, because the motor generator 6 is normally fixed at the input shaft 7a of the automatic transmission apparatus 7, the power transmitted from the automatic transmission apparatus 7 is directly used, thereby improving a regeneration efficiency. Furthermore, because the control unit 8 controls (operates) the lock up clutch 2e, which is normally provided at the torque converter 2, and the clutch 7b, which is normally provided at the automatic transmission apparatus 7, additional clutch does not need to be provided between the engine 1 and the torque converter 2. Accordingly, a relatively large space does not need to be prepared to mount the hybrid drive device, which may result in reducing the manufacturing costs. Additionally, the engine torque vibration is attenuated by the fluid, which is fully accommodated within the torque converter 2, and the lock-up damper, which is generally provided. Accordingly, two damper mechanism do not need to be provided at the hybrid drive device. Accordingly, the downsize of the hybrid drive device is achievable, which may further result in reducing the manufacturing costs.

Sixth Embodiment

A sixth embodiment of a hybrid drive device will be described below with reference to the attached drawings. Illustrated in FIG. 15 is a schematic diagram of a configuration example of the hybrid drive device according to the sixth embodiment.

The hybrid drive device according to the sixth embodiment differs from the hybrid drive device according to the fifth embodiment in that the hybrid drive device according to the sixth embodiment includes the clutch 3, which is configured so as to be arbitrarily turned to be in an engaged state and a disengaged state, on the power transmission path between the input shaft 1a of the engine 1 (the torque converter housing 2a) and the pump impeller 2b. The clutch 3 is controlled by the control unit 8. Other configurations of the hybrid drive device according to the sixth embodiment are similar to the fifth embodiment, therefore, only the difference between the fifth embodiment and the sixth embodiment will be described below.

An operation of the hybrid drive device according to the sixth embodiment will be described below. In the case where the driving force becomes not necessary while the vehicle travels by the engine operation (i.e. in the case where the driver releases an acceleration pedal (acceleration off)), the control unit 8 controls the lock-up clutch 2e to be released (i.e. the disengaged state) in the process of transiting to the regeneration mode, thereby stopping the engine 1 (i.e. the regeneration mode). In this case, the control unit 8 also controls the clutch 3 to be released (i.e. the disengaged state), so that the reverse driving force, which is inputted from the vehicle (i.e.

the wheels), is regenerated at the motor generator 6 without being absorbed by the engine 1 and without causing an energy absorption by the torque converter 2. Furthermore, because the engine 1 is stopped, the fuel consumption of the vehicle may be improved. Other modes are executed while the clutch 3 is in the engaged state.

According to the sixth embodiment, advantages and effects similar to the fifth embodiment are achievable. Additionally, according to the sixth embodiment, heating within the torque converter 2 is avoided, therefore, the regeneration efficiency is further improved when comparing to the fifth embodiment.

Seventh Embodiment

Figure 16:
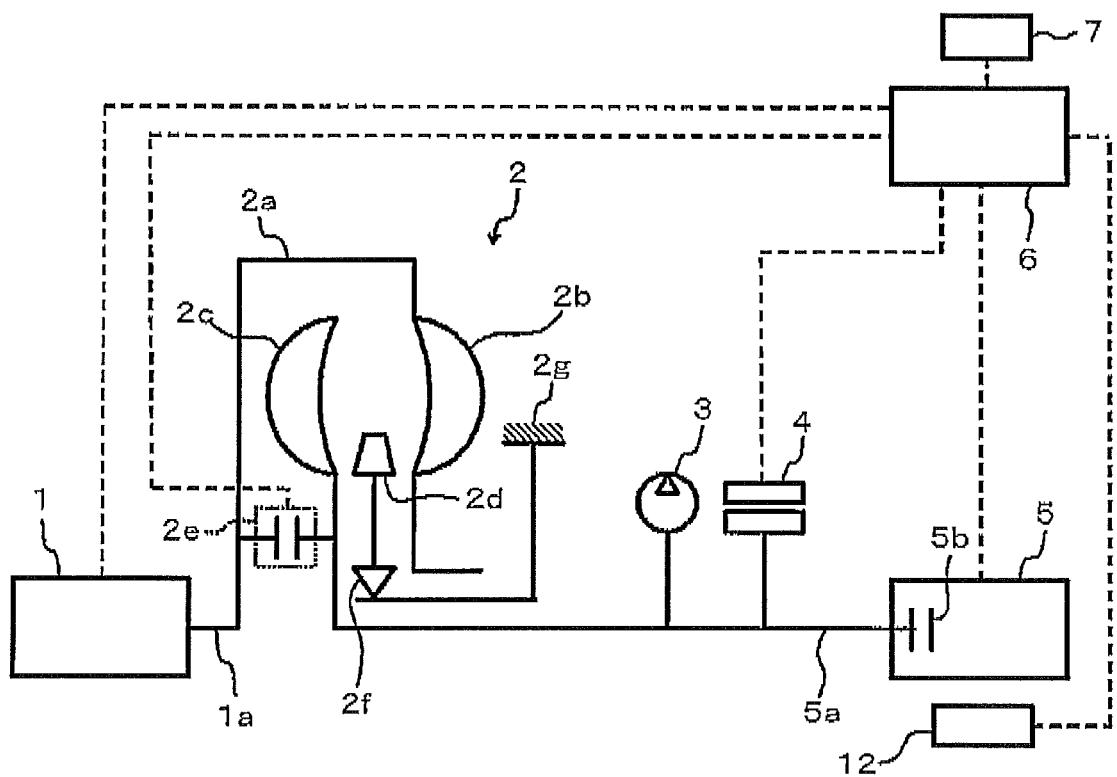
FIG. 16 is a diagram illustrating a configuration of a hybrid drive device according to a seventh embodiment.

A seventh embodiment of a hybrid drive device will be described below with reference to the drawing. Illustrated in FIG. 16 is a schematic diagram of a configuration example of the hybrid drive device according to the seventh embodiment.

The hybrid drive device according to the seventh embodiment differs from the hybrid drive device according to the fifth embodiment in that the hybrid drive device according to the seventh embodiment includes the auxiliary electric oil pump 12, which is configured so as to be actuated even in the case where the engine 1, the motor generator 6 and the vehicle are stopped. Other configurations of the hybrid drive device according to the seventh embodiment are similar to the fifth embodiment, therefore, only the differences between the fifth embodiment and the seventh embodiment will be described below. Additionally, the auxiliary electric oil pump 12 may be adapted to the hybrid drive device according to the sixth embodiment.

The auxiliary electric oil pump 12 is the oil pump, which is actuated by the electric power. The auxiliary electric oil pump 12 is provided at the hybrid drive device in order to assist the transmission oil pump 5. As is the case with the transmission oil pump 5, the auxiliary electric oil pump 12 also generates a hydraulic pressure for actuating mainly the friction elements used for establishing the gear stages in the automatic transmission apparatus 7. Furthermore, the auxiliary electric oil pump 12 generates the hydraulic pressure for actuating the lock-up clutch 2e. Additionally, the auxiliary electric oil pump 12 is controlled by the control unit 8.

An operation of the hybrid drive device according to the seventh embodiment will be described below.

<1. EV Start/EV Drive Mode>

In the EV start/EV drive mode, the control unit 8 firstly actuates the auxiliary electric oil pump 12 while the vehicle is in the stopped state in order to establish the starting stage at the automatic transmission apparatus 7 by means of the hydraulic pressure generated by the auxiliary electric oil pump 12. Then, in the starting process, the control unit 8 rotates the motor generator 6, so that the driving force generated by the motor generator 6 is transmitted to the automatic transmission apparatus 7 via the torque converter 2 (i.e. the fluid or the lock-up clutch 2e). Accordingly, the vehicle starts moving. In this case, because the transmission oil pump 5 is actuated in response to the rotation of the motor generator 6, the auxiliary electric oil pump 12 may be stopped.

<2. Engine Start Mode>

In the case where the power stored within the battery 9 is insufficient while the vehicle is stopped and the vehicle is not started to move by the motor generator 6 (however, the engine 1 is startable), the control unit 8 controls the lock-up clutch 2e so that the lock-up clutch 2e is preliminarily turned to be in the engaged state by the hydraulic pressure generated by the auxiliary electric oil pump 12 (i.e. the engine start mode). Accordingly, the driving force generated by the motor generator 6 is inputted to the engine 1 via the lock-up clutch 2e, thereby starting the engine 1. Then, the control unit 8 controls the automatic transmission apparatus 7 to establish the starting stage (including the engagement of the clutch 7b), so that the driving force generated by the engine 1 is inputted to the automatic transmission apparatus 7 via the torque converter 2 (i.e. the fluid or the lock-up clutch 2e). As a result, the vehicle starts moving.

According to the seventh embodiment, advantages and effects similar to the fifth embodiment are achievable. Furthermore, because the hybrid drive device according to the seventh embodiment includes the auxiliary electric oil pump 12, the automatic transmission apparatus 7 preliminarily establishes the starting stage when starting to move the vehicle and the lock-up clutch 2e is preliminarily turned to be in the engaged state when starting the engine 1. Therefore, the responsiveness of the hybrid drive device is further improved.

Eighth Embodiment

Figure 17:
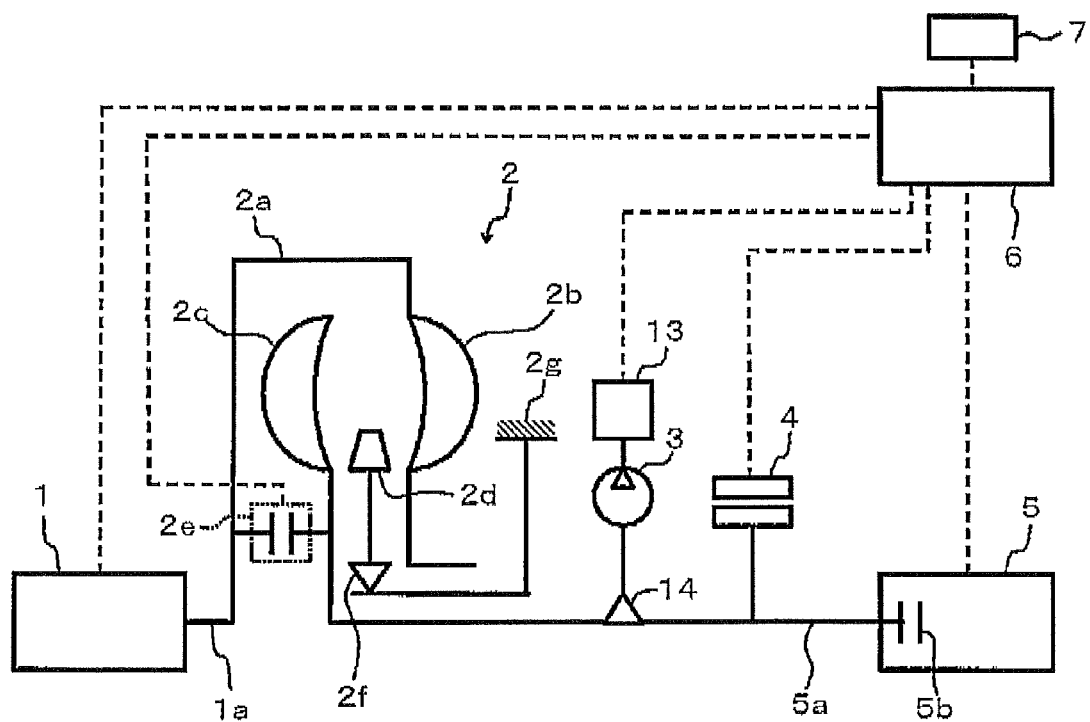
FIG. 17 is a diagram illustrating a configuration of a hybrid drive device according to an eighth embodiment.

An eighth embodiment of a hybrid drive device will be described below with reference to the attached drawing. Illustrated in FIG. 17 is a schematic diagram of a configuration example of the hybrid drive device according to the eighth embodiment.

The hybrid drive device according to the eighth embodiment differs from the hybrid drive device according to the fifth embodiment in that the hybrid drive device according to the eighth embodiment further includes the auxiliary motor 13 and the one-way clutch 14. The auxiliary motor 13 auxiliary drives the transmission oil pump 5 even in the case where the engine 1, the motor generator 6 and the vehicle are stopped. The one-way clutch 14 does not transmit the driving force generated by the auxiliary motor 13 (the transmission oil pump 5) to the turbine impeller 2c, the motor generator 6 and the automatic transmission apparatus 7. Furthermore, the one-way clutch 14 is arranged on the power transmission path between the turbine impeller 2c and the motor generator 6 on the one hand and the transmission oil pump 5 on the other. Other configurations of the hybrid drive device according to the eighth embodiment are similar to the fifth embodiment. Therefore, only the differences between the fifth embodiment and the eighth embodiment will be described below. Additionally, the auxiliary motor 13 and the one-way clutch 14 may be adapted to the hybrid drive device according to the sixth embodiment.

The auxiliary motor 13 is the motor for auxiliary driving the transmission oil pump 5. The auxiliary motor 13 is controlled by the control unit 8.

The one-way clutch 14 is the free-wheel that does not transmit the driving force generated by the auxiliary motor 13 (the transmission oil pump 6) to the turbine impeller 2c, the motor generator 6 and the automatic transmission apparatus 7 and that transmits the driving forces generated by the turbine impeller 2c, the motor generator 6 and the automatic transmission apparatus 7 to the transmission oil pump 5.

An operation of the hybrid drive device according to the eighth embodiment will be described below.

<1. EV Start/EV Drive Mode>

In the EV start/EV drive mode, the control unit 8 firstly actuates the auxiliary motor 13 while the vehicle is in the stopped state in order to establish the starting stage at the automatic transmission apparatus 7 by means of the hydraulic pressure generated by the transmission oil pump 5. In this case, the rotational force inputted to the transmission oil pump 5 from the auxiliary motor 13 is not transmitted to the turbine impeller 2c, the motor generator 6 and the automatic transmission apparatus 7 because of the one-way clutch 14. Then, in the starting process, the control unit 8 rotates the motor generator 6, so that the driving force generated by the motor generator 6 is transmitted to the automatic transmission apparatus 7. Accordingly, the vehicle starts moving. Additionally, in this case, because the transmission oil pump 5 is actuated in response to the rotation of the motor generator 6 via the one-way clutch 14, the auxiliary motor 13 may be stopped.

<2. Engine Start Mode>

In the case where the power stored within the battery 9 is insufficient while the vehicle is stopped and the vehicle is not started to move by the motor generator 6 (however, the engine 1 is startable), the control unit 8 drives the auxiliary motor 13 in the starting process, so that the lock-up clutch 2e is preliminarily turned to be in the engaged state by the hydraulic pressure generated by the transmission oil pump 5 (i.e. the engine start mode). Accordingly, the driving force generated by the motor generator 6, is inputted to the engine 1 via the lock-up clutch 2e, thereby starting the engine 1. Then, the control unit 8 controls the automatic transmission apparatus 7 to establish the starting stage (including the engagement of the clutch 7b), so that the driving force generated by the engine 1 is inputted to the automatic transmission apparatus 7 via the torque converter 2 (i.e. the fluid or the lock-up clutch 2e). As a result, the vehicle starts moving.

According to the eighth embodiment, advantages and effects similar to the fifth embodiment are achievable. Furthermore, because the hybrid drive device according to the eighth embodiment includes the auxiliary motor 13, the automatic transmission apparatus 7 preliminarily establishes the starting stage when starting to move the vehicle and the lock-up clutch 2e is preliminarily turned to be in the engaged state when starting the engine 1. Therefore, the responsiveness of the hybrid drive device is further improved.

According to the embodiments, the pump impeller 2b is integrally rotated with the output shaft 1a of the engine 1.

According to the embodiments, the hybrid drive device includes the control unit (8) for controlling the operations of the engine 1, the motor generator 6, the automatic transmission apparatus 7 and the lock-up clutch 2e.

According to the embodiments, the hybrid drive device includes the auxiliary electric oil pump 12, which is provided at the hybrid drive device separately from the transmission oil pump 5, generates a hydraulic pressure for actuating the automatic transmission apparatus 7 and the lock-up clutch 2e and which is driven by an electric power. Furthermore, the control unit 8 controls the operation of the auxiliary electric oil pump 12.

According to the embodiments, the hybrid drive device includes the clutch 3 for connecting the engine 1 and the pump impeller 2b to establish the power transmission therebetween and disconnecting the engine 1 and the pump impeller (2b) to interrupt the power transmission therebetween.

According to the embodiments, the hybrid drive device includes the control unit 8) for controlling the engine 1, the motor generator 6, the automatic transmission apparatus 7 and the lock-up clutch 2e and the operation of the lock-up clutch 2e.

According to the embodiments, the hybrid drive device includes the auxiliary electric oil pump 12, which is provided at the hybrid drive device separately from the transmission oil pump 5, generates the hydraulic pressure for actuating the automatic transmission apparatus 7, the lock-up clutch 2e and the clutch 3 and which is driven by the electric power. Furthermore, the control unit 8 controls the operation of the auxiliary electric oil pump 12.

According to the embodiments, the hybrid drive device includes the auxiliary motor 13 and the one-way clutch 14. The auxiliary motor 13 drives the transmission oil pump 5. The one-way clutch 4 is provided on the power transmission path between the pump impeller 2b and the transmission oil pump 5 and transmits the torque only from the pump impeller 2b to the transmission oil pump 5. Furthermore, the control unit 8 controls the operation of the auxiliary motor 13.

According to the embodiments, the lock-up clutch 2e includes the damper for absorbing the torque vibration generated by the engine 1.

According to the embodiments, the lock-up clutch 2e serves as the clutch mechanism.

Accordingly, because the motor generator 6 and the input shaft 7a of the automatic transmission apparatus 7 are integrally rotated, the power transmitted from the automatic transmission apparatus 7 is directly used, thereby improving the regeneration efficiency. Furthermore, because the control unit 8 controls (operates) the lock up clutch 2e, which is normally provided at the torque converter 2, and the clutch 7b, which is normally provided at the automatic transmission apparatus 7, an additional clutch does not need to be provided between the engine 1 and the torque converter 2. Accordingly, the space for mounting the hybrid drive device may be reduced, which may further result in reducing the manufacturing costs. Additionally, the engine torque vibration is attenuated by the fluid, which is fully accommodated within the torque converter 2, and the lock-up damper, which is generally provided. Accordingly, two damper mechanism do not need to be provided at they hybrid drive device. Accordingly, the downsize of the hybrid drive device is achievable, which may further result in reducing the manufacturing costs.

According to the embodiments, the first clutch mechanism is configured with the clutch 3, which interrupts and establishes the power transmission between the engine 1 and the pump impeller 2b, and the first one-way clutch 4, which is arranged in parallel with the clutch 3 and transmits the torque only from the engine 1 to the pump impeller 2b.

According to the embodiments, the hybrid drive device includes the control unit 8 for controlling operations of the engine 1, the motor generator 6, the automatic transmission apparatus 7, the lock-up clutch 2e and the clutch 3.

According to the embodiments, the two-way clutch 11 serves as the first clutch, which is switchable between the first mode for transmitting the torque only from the engine 1 to the pump impeller 2b and the second mode for transmitting the torque only from the pump impeller 2b to the engine 1.

According to the embodiments, the hybrid drive device includes the control unit 8 for controlling the operations of the engine 1, the motor generator 6, the automatic transmission apparatus 7, the lock-up clutch 2e and the two-way clutch 11.

According to the embodiments, the hybrid drive device includes the auxiliary electric oil pump 12, which is provided at the hybrid drive device separately from the transmission oil pump 5, generates the hydraulic pressure for actuating the automatic transmission apparatus 7, the first clutch mechanism and the second clutch mechanism and which is driven by the electric power. Furthermore, the control unit 8 controls the operation of the auxiliary electric oil pump 12.

According to the embodiments, the hybrid drive device includes then auxiliary motor 13 and the one-way clutch 14. The auxiliary motor 13 drives the transmission oil pump 5. The one-way clutch 14 is provided on the power transmission path between the pump impeller 2b and the transmission oil pump 5 and transmits the torque only from the pump impeller 2b to the transmission oil pump 5. Additionally, the control unit 8 controls the operation of the auxiliary motor 13.

According to the embodiments, the lock-up clutch 2e includes the damper for absorbing the torque vibration generated at the engine 1.

According to the embodiment, the lock-up clutch 2e serves as the second clutch mechanism.

Accordingly, because the engine torque vibration is attenuated by the fluid, which is fully accommodated within the torque converter 2, and the lock-up damper, which is generally provided, an additional damper mechanism does not need to be provided at the hybrid drive device. Therefore, the hybrid drive device may be provided at a relatively small mounting space, thereby reducing the manufacturing costs. Furthermore, the transmission oil pump 5 is actuated by any means of the engine 1 and the motor generator 6 in any condition by combining the disengaged state and the engaged state of the clutch 3 and the disengaged state and the engaged state of the lock-up clutch 2e. Therefore, even in the case where the driving force by the motor generator 6 is not likely to be obtained, the vehicle may be immediately started to move. Furthermore, when starting the vehicle, the automatic transmission apparatus 7 is controlled so as to establish the starting stage and the lock-up clutch 2e is preliminarily turned to be in the engaged state, so that the loss of the driving force, which is likely to occur when starting the vehicle, is reduced, thereby improving the fuel consumption.

The principles, preferred embodiment and mode of operation of this disclosure have been described in the foregoing specification. However, the disclosure which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the disclosure as defined in the claims, be embraced thereby.

The invention claimed is:

1. A hybrid drive device including a motor generator on a power transmission path between an engine and an automatic transmission apparatus, the hybrid drive device comprising:
    a fluid clutch having a pump impeller, to which a rotational force generated by the engine is inputted, and a turbine impeller being rotated when receiving a fluid from the pump impeller and outputting a rotational force to the automatic transmission apparatus;
    a first clutch mechanism provided on a power transmission path between the engine and the pump impeller and selectively executing a torque transmission from the engine to the pump impeller and a torque transmission from the pump impeller to the engine;
    a second clutch mechanism for connecting the pump impeller and the turbine impeller to establish a power transmission therebetween and disconnecting the pump impeller and the turbine impeller to interrupt the power transmission therebetween; and
    an oil pump integrally rotating with the pump impeller and generating a hydraulic pressure for actuating the automatic transmission apparatus, the first clutch mechanism and the second clutch mechanism, wherein
    the motor generator integrally rotates with the pump impeller; and
    wherein the first clutch mechanism is configured with a clutch, which interrupts and establishes a power transmission between the engine and the pump impeller, and a first one-way clutch, which is arranged in parallel with the clutch and transmits a torque only from the engine to the pump impeller.

2. The hybrid drive device according to claim 1, further comprising a control unit for controlling operations of the engine, the motor generator, the automatic transmission apparatus, the second clutch mechanism and the clutch.

3. The hybrid drive device according to claim 1, wherein the first clutch mechanism is a two-way clutch, which is switchable between a first mode for transmitting a torque only from the engine to the pump impeller and a second mode for transmitting the torque only from the pump impeller to the engine.

4. The hybrid drive device according to claim 3, further comprising a control unit for controlling operations of the engine, the motor generator, the automatic transmission apparatus, the second clutch mechanism and the two-way clutch.

5. The hybrid drive device according to claim 2, further comprising an auxiliary electric oil pump, wherein the auxiliary electric oil pump is provided at the hybrid drive device separately from the oil pump, generates a hydraulic pressure for actuating the automatic transmission apparatus, the first clutch mechanism and the second clutch mechanism and is driven by an electric power, and wherein the control unit also controls an operation of the auxiliary electric oil pump.

6. The hybrid drive device according to claim 2, further comprising an auxiliary motor and a second one-way clutch, wherein the auxiliary motor drives the oil pump, the second one-way clutch is provided on a power transmission path between the pump impeller and the oil pump and transmits a torque only from the pump impeller to the oil pump, and the control unit controls an operation of the auxiliary motor.

7. The hybrid drive device according to claim 1, wherein the second clutch mechanism includes a damper for absorbing a torque vibration generated at the engine.

8. The hybrid drive device according to claim 1, wherein the second clutch mechanism is a lock-up clutch.

* * * * *